US012561857B2

(12) United States Patent
    Agarwal et al.

(10) Patent No.:    US 12,561,857 B2
(45) Date of Patent:      Feb. 24, 2026

(54) MULTI-ATTRIBUTE INVERSION FOR TEXT-TO-IMAGE SYNTHESIS

(71) Applicant: ADOBE INC., San Jose, CA (US)

(72) Inventors: Aishwarya Agarwal, Karnataka (IN); Srikrishna Karanam, Karnataka (IN); Tripti Shukla, Karnataka (IN); Balaji Vasan Srinivasan, Karnataka (IN)

(73) Assignee: ADOBE INC., San Jose, CA (US)

( * ) Notice: Subject to any disclaimer, the term of this patent is extended or adjusted under 35 U.S.C. 154(b) by 165 days.

(21) Appl. No.: 18/513,071

(22) Filed: Nov. 17, 2023

(65) Prior Publication Data

US 2025/0166243 A1     May 22, 2025

(51) Int. Cl.
    *G09G 5/02*        (2006.01)
    *G06F 40/284*      (2020.01)
    (Continued)

(52) U.S. Cl.
    CPC .......... *G06T 11/001* (2013.01); *G06F 40/284* (2020.01); *G06N 3/0455* (2023.01);
    (Continued)

(58) Field of Classification Search
    CPC .... G09G 5/02; G09G 5/06; G09G 2320/0666; G09G 2340/06; G09G 3/20; G09G 2320/0626; G09G 2360/144; G09G 2360/16; G09G 5/006; G09G 2320/0276; G09G 2320/066; G09G 2370/042; G09G 2370/12; G09G 3/2003; G09T 11/001; G06F 2200/1614; G06F 2200/1637; G06F 3/1454; G06F 3/1432; G06T 11/001; G06T 11/20; G06T 11/40; G06T 11/60; G06T 11/00; G06T 5/40; G06T 2207/10024; G06T 2207/20081; G06T 2207/20084

(Continued)

(56) References Cited

U.S. PATENT DOCUMENTS

| 10,713,821 B1 * | 7/2020 | Surya ..................... G06N 3/045 |
| 2023/0095092 A1 * | 3/2023 | Xiao ......................... G06T 5/70 |
| | | 382/254 |

(Continued)

OTHER PUBLICATIONS

Search Report dated Oct. 18, 2024 in related United Kingdom Patent Application No. 2407761.2, 4 pages.

(Continued)

*Primary Examiner* — Gordon G Liu
(74) *Attorney, Agent, or Firm* — F. CHAU & ASSOCIATES, LLC

(57)            ABSTRACT

An image generation model obtains a text prompt, a first attribute token, and a second attribute token. A first set of layers of the image generation model and a first set of time-steps are identified for the first attribute token and a second set of layers of the image generation model and a second set of time-steps are identified for the second attribute token. A synthetic image is generated based on the text prompt, the first attribute token, and the second attribute token by providing the first attribute token to the first set layers of the image generation model during the first set of time-steps and providing the second attribute token to the second set of layers of the image generation model during the second set of time-steps.

20 Claims, 15 Drawing Sheets

(51) Int. Cl.
    *G06N 3/0455*     (2023.01)
    *G06N 3/084*     (2023.01)
    *G06T 11/00*     (2006.01)
    *G06T 11/60*     (2006.01)
(52) U.S. Cl.
    CPC .............. *G06N 3/084* (2013.01); *G06T 11/60*
        (2013.01); *G06T 2200/24* (2013.01)
(58) Field of Classification Search
    USPC ......................................................... 345/589
    See application file for complete search history.

(56) References Cited

U.S. PATENT DOCUMENTS

| | | | |
|---|---|---|---|
| 2023/0112302 A1* | 4/2023 | Marks | G06T 13/80 |
| | | | 345/419 |
| 2024/0221235 A1* | 7/2024 | Gafni | G06T 9/00 |
| 2025/0103868 A1* | 3/2025 | Sieniawski | G06N 3/0475 |

OTHER PUBLICATIONS

Kawar, et al., "Imagic: Test-Based Real Image Editing with Diffusion Models", 2023 IEEE/CVF Conference on Computer Vision and Pattern Recognition (CVPR), pp. 6007-6017.

Nair, et al., "Unite and Conquer: Plug & Play Multi-Modal Synthesis using Diffusion Models", 2023 IEEE/CVF Conference on Computer Vision and pattern Recognition (CVPR), pp. 6070-6079.

1Abdal, et al., "Image2StyleGAN: How to Embed Images into the StyleGAN Latent Space?", In Proceedings of the IEEE/CVF International Conference on Computer Vision, (2019), pp. 4432-4441.

2Abdal, et al., "Image2StyleGAN++: How to edit the Embedded Images?", In Proceedings of the IEEE/CVF Conference on Computer Vision and Pattern Recognition, pp. 8296-8305, (2020).

3Alaluf, et al., "HyperStyle: StyleGAN Inversion with HyperNetworks for Real Image Editing", In Proceedings of the IEEE/CVF Conference on Computer Vision and Pattern Recognition, pp. 18511-18521, (2022).

4Bermano, et al., "State-of-the-Art in the Architecture, Methods and Applications of StyleGAN", arXiv preprint arXiv:2202.14020v1 [cs.CV] Feb. 28, 2022, 19 pages.

5Creswell, et al., "Inverting the Generator of a Generative Adversarial Network", IEEE Transactions on Neural Networks and Learning Systems, 30(7), pp. 1967-1974, (Jul. 2019).

6Gal, et al., "An Image is Worth One Word: Personalizing Text-to-Image Generation Using Textual Inversion", arXiv:2208.01618v1 [cs.CV] Aug. 2, 2022, 26 pages.

7Ho, et al., "Denoising Diffusion Probabilistic Models", in 34th Conference on Neural Information Processing Systems (NeurIPS 2020), 33, pp. 6840-6851.

8Kumari, et al., "Multi-Concept Customization of Text-to-Image Diffusion", In Proceedings of the IEEE/CVF Conference on Computer Vision and Pattern Recognition, (2023), pp. 1931-1941.

9Lipton, et al., "Precise Recovery of Latent Vectors From Generative Adversarial Networks", arXiv preprint arXiv:1702.04782v2 [cs.LG] Feb. 17, 2017, pp. 1-4.

10Mou, et al., "T21-Adapter: Learning Adapters to Dig out More Controllable Ability for Text-to-Image Diffusion Models." arXiv preprint arXiv:2302.08453v2 [cs.CV] Mar. 20, 2023, 10 pages.

11Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.

12Nitzan, et al., "MyStyle: A Personalized Generative Prior", in ACM Transactions on Graphics (TOG), vol. 41, No. 6, Article 203, Dec. 2022, 10 pages.

13Radford, et al., "Learning Transferable Visual Models From Natural Language Supervision", In Proceedings of the 38th International Conference on Machine Learning, PMLR 139, 2021, pp. 8748-8763.

14Ramesh, et al., "Hierarchical Text-Conditional Image Generation with CLIP Latents", arXiv preprint arXiv:2204.06125v1 [cs.CV] Apr. 13, 2022, 27 pages.

15Roich, et al., "Pivotal Tuning for Latent-based Editing of Real Images", arXiv preprint arXiv:2106.05744v1 [cs.CV] Jun. 10, 2021, p. 1-26.

16Rombach, et al., "High-Resolution Image Synthesis with Latent Diffusion Models", In Proceedings of the IEEE/CVF Conference on Computer Vision and Pattern Recognition, (2022), pp. 10684-10695.

17Ronneberger, et al., "U-Net: Convolutional Networks for Biomedical Image Segmentation", arXiv preprint arXiv:1505.04597v1 [cs.CV] May 18, 2015, 8 pages.

18Ruiz, et al., "DreamBooth: Fine Tuning Text-to-Image Diffusion Models for Subject-Driven Generation", In Proceedings of the IEEE/CVF Conference on Computer Vision and Pattern Recognition, (2023), pp. 22500-22510.

19Saharia, et al., "Photorealistic Text-to-Image Diffusion Models with Deep Language Understanding", in 36th Conference on Neural Information Processing Systems (NeurIPS 2022), 16 pages.

20Sohl-Dickstein, et al., "Deep Unsupervised Learning using Nonequilibrium Thermodynamics", In Proceedings of the 32nd International Conference on Machine Learning, 2015, JMLR: W&CP vol. 37, pp. 2256-2265.

21Song, et al., "Denoising Diffusion Implicit Models", arXiv preprint arXiv:2010.02502v4 [cs.LG] Oct. 5, 2022, pp. 1-22.

22Tewel, et al., "Key-Locked Rank One Editing for Text-to-Image Personalization", In SIGGRAPH '23 Conference Proceedings, Aug. 2023, 11 pages.

23Voynov, et al., "P+: Extended Textual Conditioning in Text-to-Image Generation", arXiv preprint arXiv:2303.09522v3 [cs.CV] Jul. 15, 2023, pp. 1-16.

24Xia, et al., "GAN Inversion: A Survey", arXiv preprint arXiv:2101.05278v5 [cs.CV] Mar. 22, 2022, pp. 3121-3138.

25Zhang, et al., "Adding Conditional Control to Text-to-Image Diffusion Models", arXiv preprint arXiv:2302.05543 (2023), pp. 3836-3847.

26Zhang, et al., "ProSpect: Expanded Conditioning for the Personalization of Attribute-aware Image Generation." arXiv preprint arXiv:2305.16225v2 [cs.GR] May 30, 2023, 15 pages.

* cited by examiner

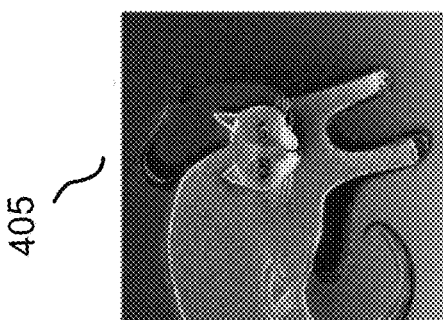

405

400

| Denoising timesteps | | | | |
|---|---|---|---|---|
| U-Net layers | 0-200 ($t_1$) | 200-400 ($t_2$) | 400-800 ($t_3$) | 800-1000 ($t_4$) |
| fine (L₁, L₂) | 410 | blue, lizard, sitting, graffiti style | blue, lizard, sitting, graffiti style | blue, lizard, sitting, graffiti style |
| moderate (L₃, L₄) | *red*, lizard, sitting, *oil painting style* | *red*, lizard, sitting, *oil painting style* | white, lizard, sitting, graffiti style | white, lizard, sitting, graffiti style |
| coarse (L₅, L₆, L₇, L₈, L₉, L₁₀) | green, cow, *standing* | green, *cat*, sitting | green, *cat*, sitting | green, cow sitting |
| moderate (L₁₁, L₁₂, L₁₃) | *red*, lizard, sitting, *oil painting style* | *red*, lizard, sitting, *oil painting style* | white, lizard, sitting, graffiti style | white, lizard, sitting, graffiti style |
| fine (L₁₄, L₁₅, L₁₆) | 420 | blue, lizard, sitting, graffiti style | blue, lizard, sitting, graffiti style | 415 |

FIG. 4

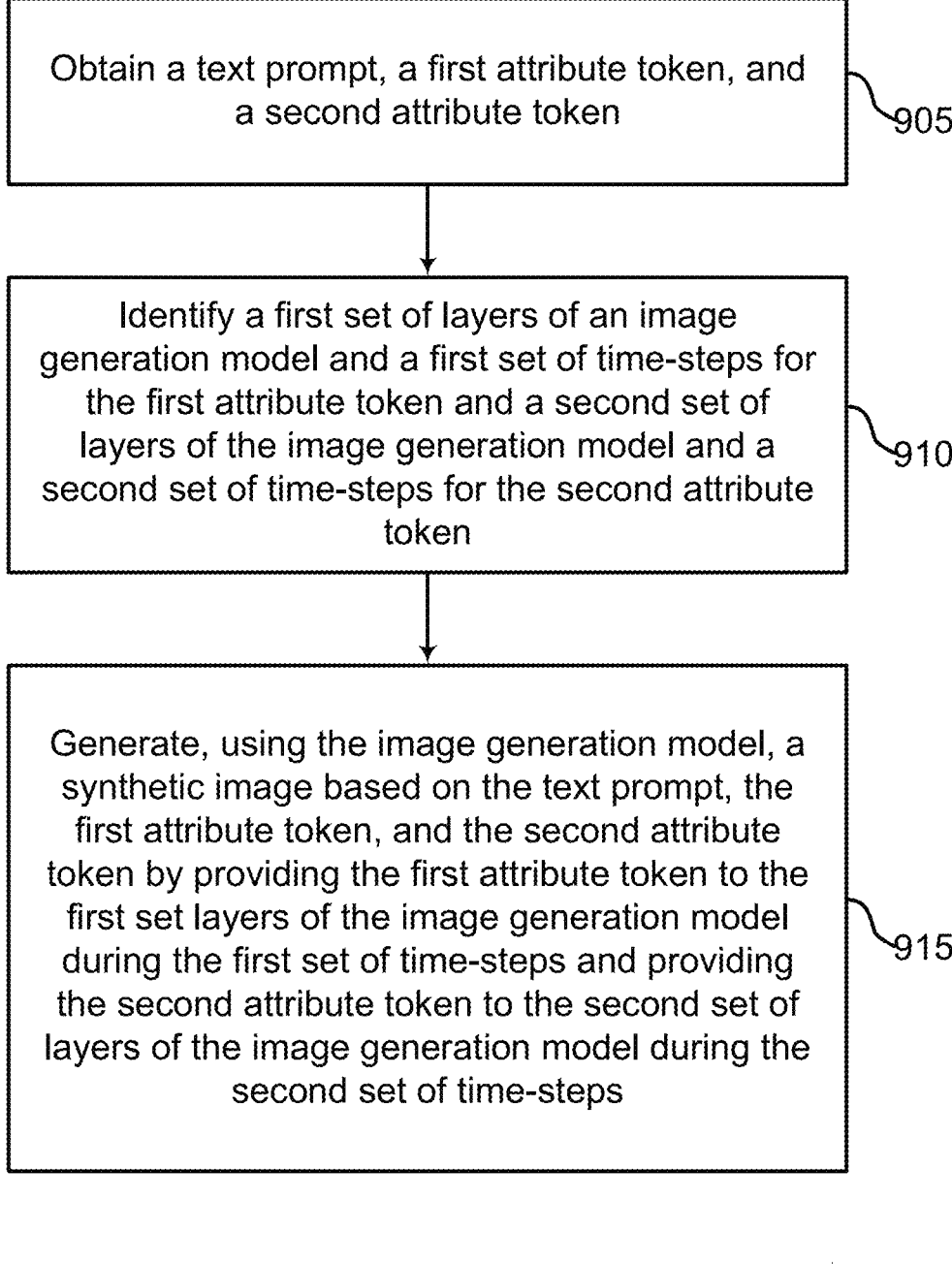

Obtain a text prompt, a first attribute token, and a second attribute token ⤷905

Identify a first set of layers of an image generation model and a first set of time-steps for the first attribute token and a second set of layers of the image generation model and a second set of time-steps for the second attribute token ⤷910

Generate, using the image generation model, a synthetic image based on the text prompt, the first attribute token, and the second attribute token by providing the first attribute token to the first set layers of the image generation model during the first set of time-steps and providing the second attribute token to the second set of layers of the image generation model during the second set of time-steps ⤷915

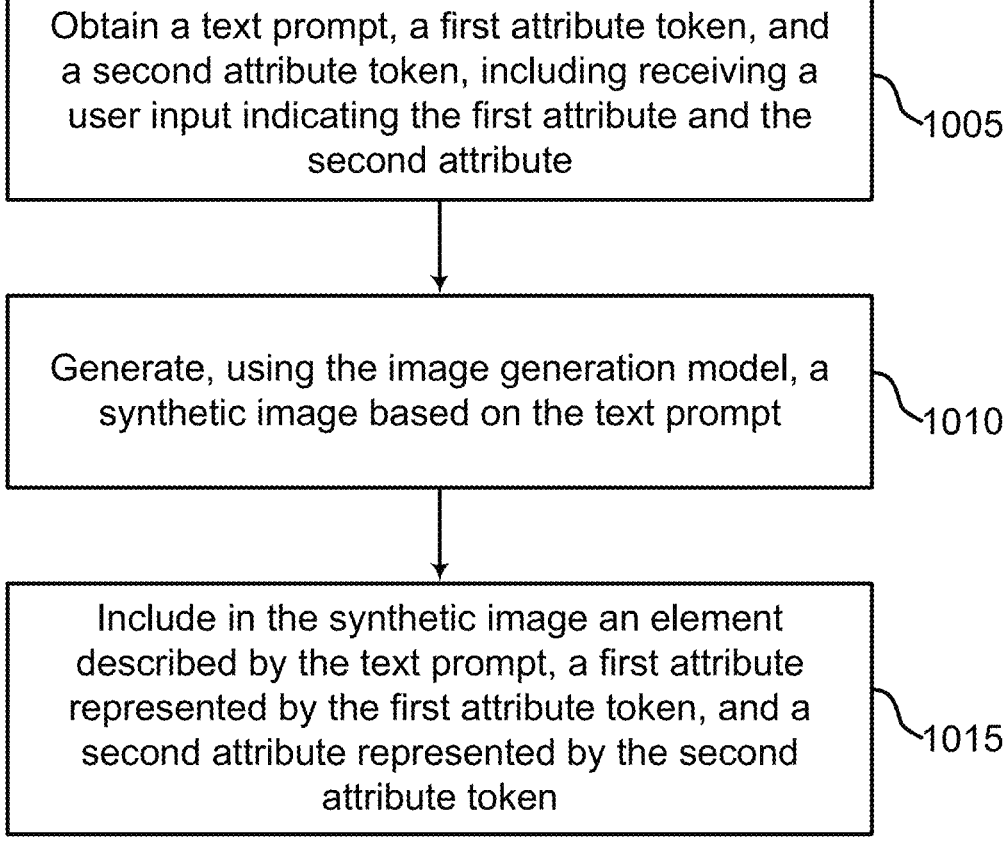

Obtain a text prompt, a first attribute token, and a second attribute token, including receiving a user input indicating the first attribute and the second attribute ⤷1005

Generate, using the image generation model, a synthetic image based on the text prompt ⤷1010

Include in the synthetic image an element described by the text prompt, a first attribute represented by the first attribute token, and a second attribute represented by the second attribute token ⤷1015

Figure 12:
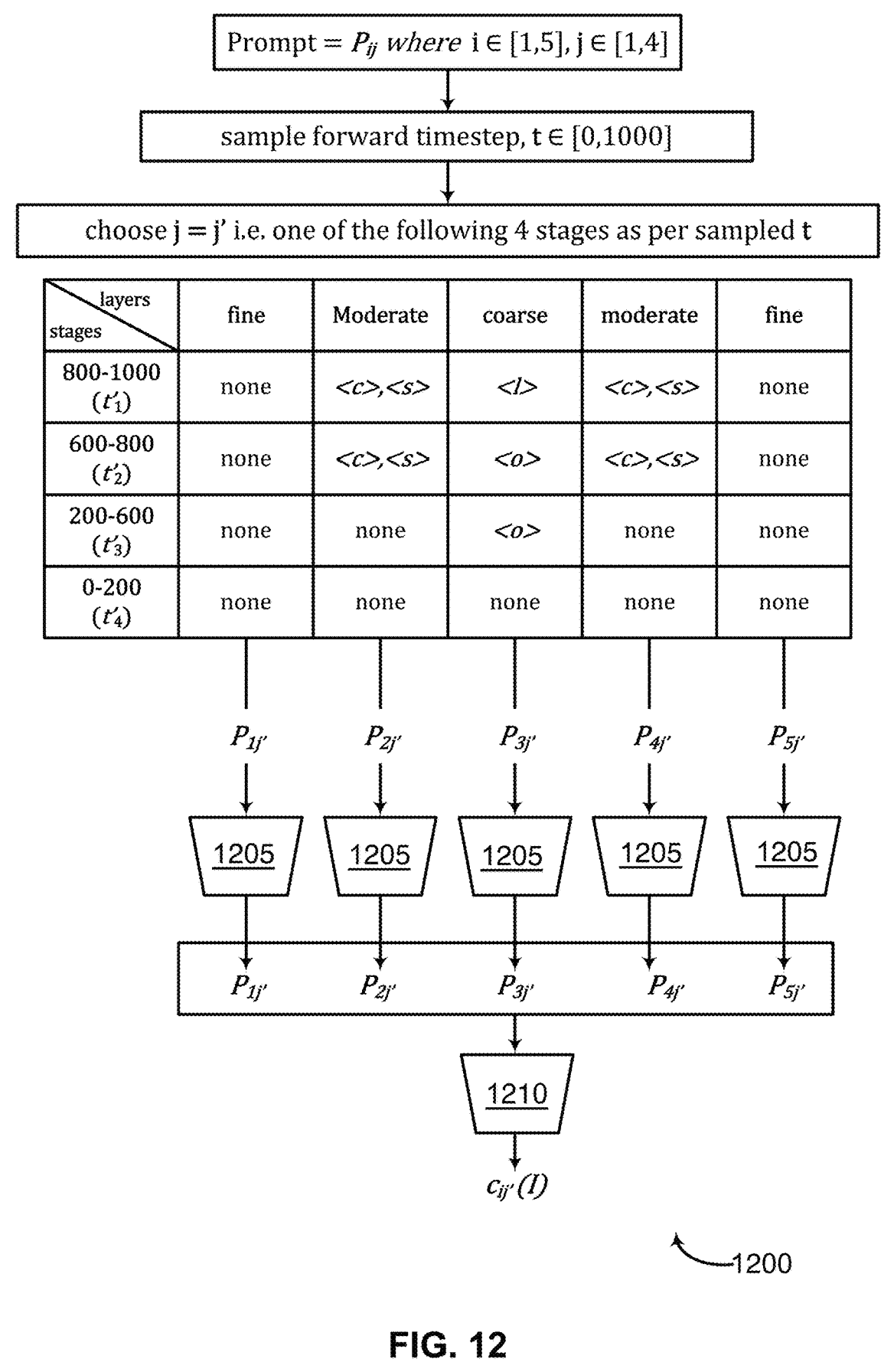

Prompt = $P_{ij}$ *where* i $\in$ [1,5], j $\in$ [1,4]

sample forward timestep, t $\in$ [0,1000]

choose j = j' i.e. one of the following 4 stages as per sampled t

| layers / stages | fine | Moderate | coarse | moderate | fine |
|---|---|---|---|---|---|
| 800-1000 $(t'_1)$ | none | $<c>,<s>$ | $<l>$ | $<c>,<s>$ | none |
| 600-800 $(t'_2)$ | none | $<c>,<s>$ | $<o>$ | $<c>,<s>$ | none |
| 200-600 $(t'_3)$ | none | none | $<o>$ | none | none |
| 0-200 $(t'_4)$ | none | none | none | none | none |

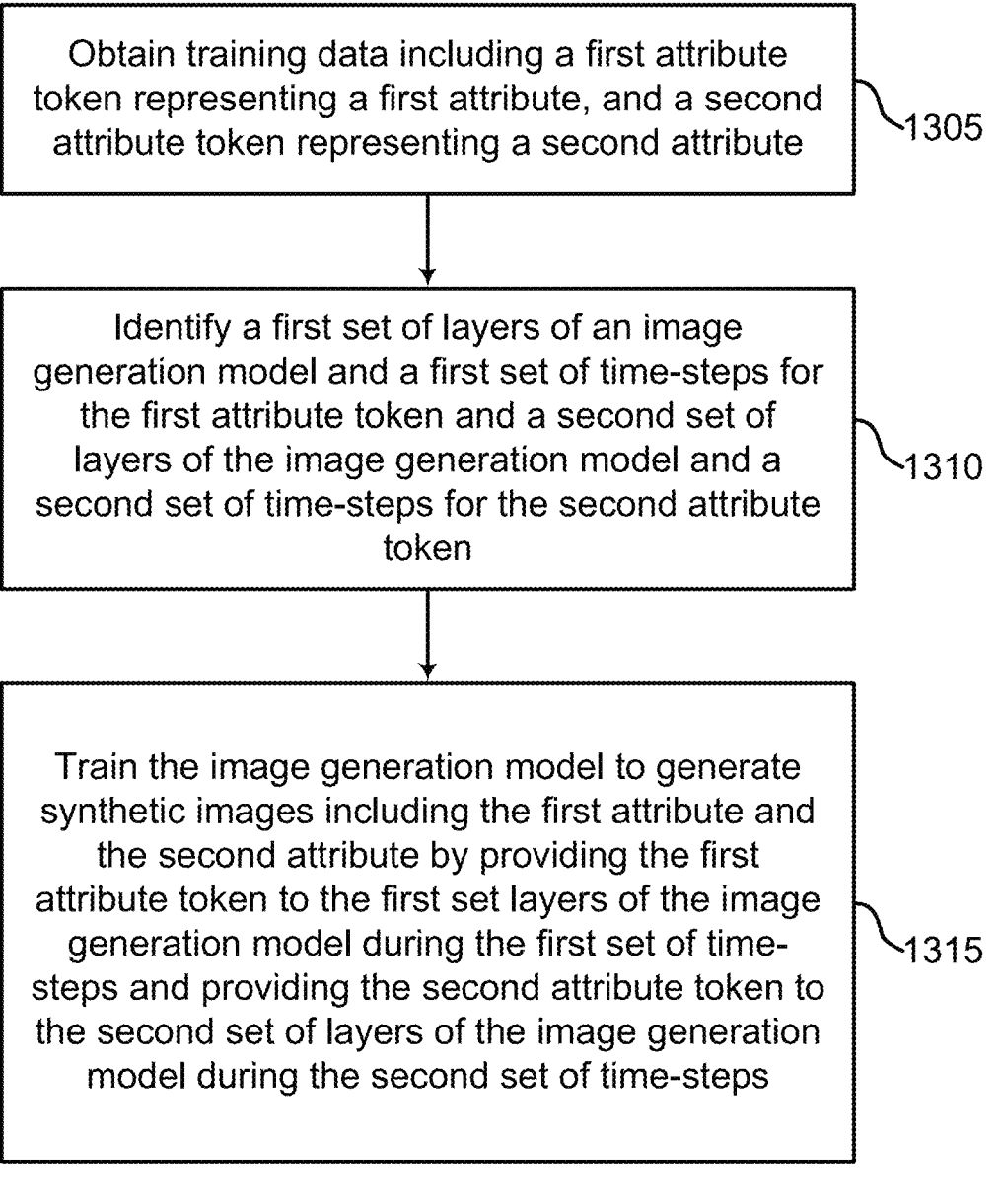

Obtain training data including a first attribute token representing a first attribute, and a second attribute token representing a second attribute ⟋1305

Identify a first set of layers of an image generation model and a first set of time-steps for the first attribute token and a second set of layers of the image generation model and a second set of time-steps for the second attribute token ⟋1310

Train the image generation model to generate synthetic images including the first attribute and the second attribute by providing the first attribute token to the first set layers of the image generation model during the first set of time-steps and providing the second attribute token to the second set of layers of the image generation model during the second set of time-steps ⟋1315

Perform a forward diffusion process on a training image to obtain a noisy input image

1405

Perform a reverse diffusion process on the noisy image to obtain a predicted image

1410

Compare the predicted image with the training image

MULTI-ATTRIBUTE INVERSION FOR TEXT-TO-IMAGE SYNTHESIS

BACKGROUND

The following relates generally to image processing, and more specifically to image generation using diffusion models. Diffusion models are increasingly used in the field of image generation, particularly for their ability to perform conditional image synthesis. By directing the generative process with specific inputs, these models facilitate the creation of images that adhere to predefined attributes or themes. The adaptability of diffusion models for such tasks has been useful in a range of applications, from design to automated content generation.

SUMMARY

A method, apparatus, and non-transitory computer readable medium for image processing are described. One or more aspects of the method, apparatus, and non-transitory computer readable medium include obtaining a text prompt, a first attribute token, and a second attribute token; identifying a first set of layers of an image generation model and a first set of time-steps for the first attribute token and a second set of layers of the image generation model and a second set of time-steps for the second attribute token; and generating, using the image generation model, a synthetic image based on the text prompt, the first attribute token, and the second attribute token by providing the first attribute token to the first set layers of the image generation model during the first set of time-steps and providing the second attribute token to the second set of layers of the image generation model during the second set of time-steps.

A method, apparatus, and non-transitory computer readable medium for image processing are described. One or more aspects of the method, apparatus, and non-transitory computer readable medium include obtaining training data including a first attribute token representing a first attribute, and a second attribute token representing a second attribute; identifying a first set of layers of an image generation model and a first set of time-steps for the first attribute token and a second set of layers of the image generation model and a second set of time-steps for the second attribute token; and training the image generation model to generate synthetic images comprising the first attribute and the second attribute by providing the first attribute token to the first set layers of the image generation model during the first set of time-steps and providing the second attribute token to the second set of layers of the image generation model during the second set of time-steps.

An apparatus and method for image processing are described. One or more aspects of the apparatus and method include at least one processor; at least one memory storing instruction executable by the at least one processor; and an image generation model comprising parameters stored in the at least one memory and trained to generate synthetic images comprising a first attribute and a second attribute by providing a first attribute token to a first set layers of the image generation model during a first set of time-steps and providing a second attribute token to a second set of layers of the image generation model during a second set of time-steps.

BRIEF DESCRIPTION OF THE DRAWINGS

FIG. 4 shows an example of multi-prompt conditioning across U-Net layers and denoising time-steps jointly according to aspects of the present disclosure.

FIG. 9 shows an example of an example of diffusion processes according to aspects of the present disclosure.

FIG. 10 shows an example of a machine learning model for computing the input conditioning according to aspects of the present disclosure.

FIG. 12 shows an example of a method for image processing according to aspects of the present disclosure.

FIG. 13 shows an example of a method for training a machine learning model according to aspects of the present disclosure.

FIG. 15 shows an example of a computing device according to aspects of the present disclosure.

DETAILED DESCRIPTION

Figure 1:
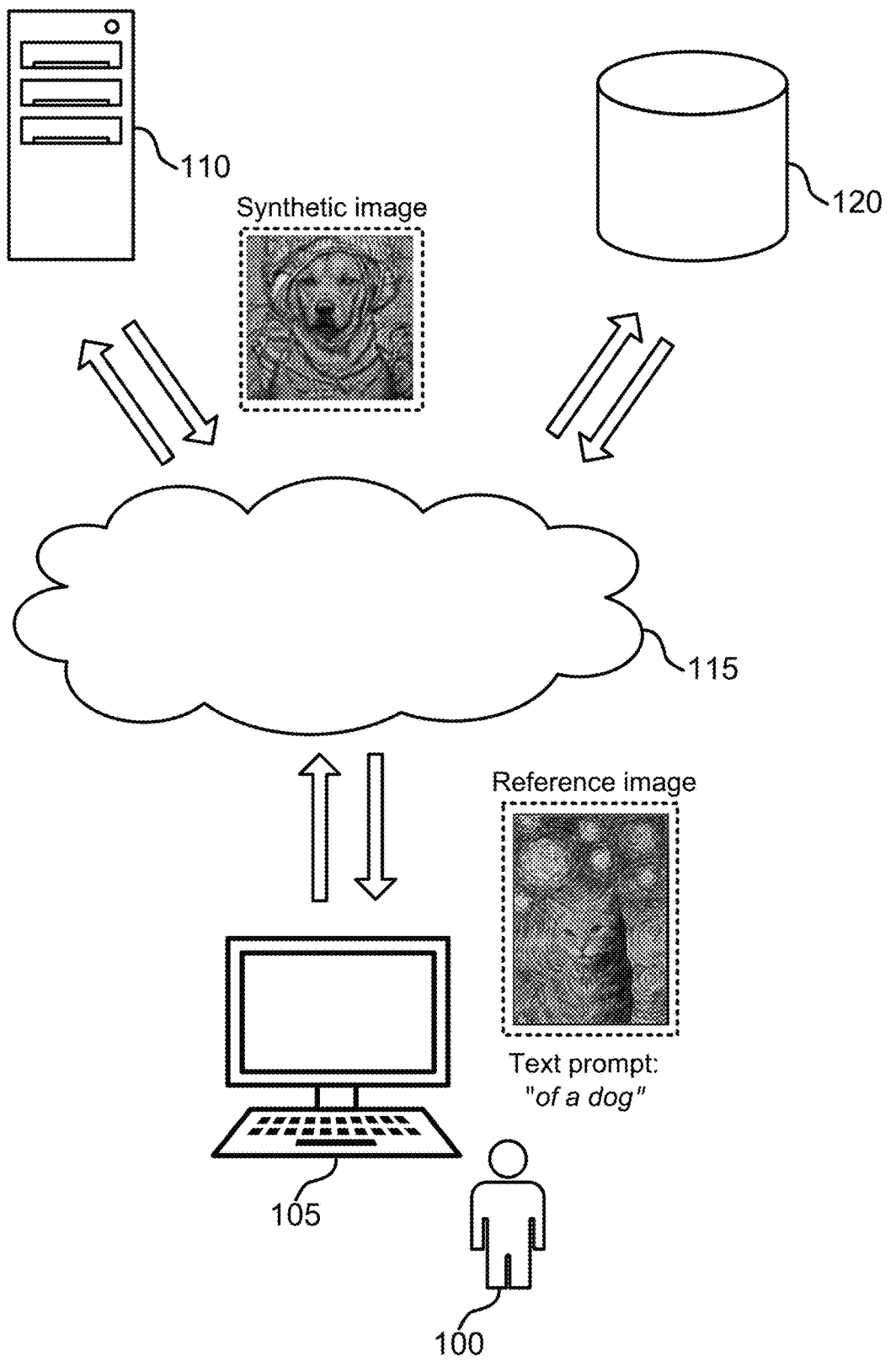
FIG. 1 shows an example of an image processing system according to aspects of the present disclosure.

Recent developments in machine learning have broadened the scope of image processing through the introduction of generative models, which can synthesize realistic images from various inputs. Diffusion models stand out for their ability to generate synthetic images that are informed by both textual descriptions and visual references.

Conventional techniques for generating personalized outputs often utilize single conditioning vectors extracted from a reference image to produce variations. These methods rely on the data represented by one vector per token to drive the customization process. Additionally, some other methods involve adjusting the weights of diffusion models to attain more personalization, and Generative Adversarial Networks (GANs) have been utilized for inversion tasks via latent optimization and model fine-tuning. However, these methods have limitations in synthesizing images with complex attributes from a reference image while maintaining user control.

Embodiments of the present disclosure include an improved image generation model that generates more accurate synthetic images based on attributes indicated by a reference image and a text prompt (e.g., a synthetic image depicting an object from the text in the style from another image). Conventional image generation apparatuses do not disentangle and extract attributes from a reference image and apply the extracted attributes from the reference image to generated images. By contrast, embodiments of the disclosure enable users to select and modify specific attributes such as color, style, layout, and object independently, allowing for more granular and creative control over the image generation process.

For example, embodiments of the present disclosure provide a method that disentangles complex attributes in the reference image by considering both the layer and time-step dimensions of Denoising Diffusion Probabilistic Models (DDPMs). This method enables identifying the specific aspects and stages of the generation process where various attributes are captured. Some embodiments include a Multi-Attribute inversion algorithm (MATTE), which includes targeted regularization losses for enhancing attribute disentanglement. MATTE operates across both layer and time-step dimensions, effectively allowing for the extraction and subsequent synthesis of images based on multiple attributes, including color, object, layout, and style, from a single reference image.

Applications of this disclosure can be integrated with image processing applications where a MATTE algorithm enables enhanced user control over the image generation process without the need for model retraining. The algorithm facilitates the generation of images that adhere to attribute constraints derived from reference images, providing the ability to produce variations that are in line with user preferences. Additionally, systems and methods described herein are designed for integration into systems with a clear UI component, which aids in the detection of infringements.

Accordingly, embodiments of the present disclosure provide a technical advancement in the area of image synthesis, providing a method for the disentangled and personalized generation of images. This can be achieved through the integration of a MATTE algorithm, thereby improving the ability to guide image synthesis using multiple attributes extracted from a user-supplied reference image.

Image Processing System

In FIGS. 1-4, a method for image processing is described. One or more aspects of the method include obtaining a text prompt, a first attribute token, and a second attribute token; identifying a first set of layers of an image generation model and a first set of time-steps for the first attribute token and a second set of layers of the image generation model and a second set of time-steps for the second attribute token; and generating, using the image generation model, a synthetic image based on the text prompt, the first attribute token, and the second attribute token by providing the first attribute token to the first set layers of the image generation model during the first set of time-steps and providing the second attribute token to the second set of layers of the image generation model during the second set of time-steps.

In some aspects, the first attribute token comprises a first token type and the second attribute token comprises a second token type, and wherein the first token type and the second token type are selected from a set of token types including a color token type, an object token type, a style token type, and a layout token type. In some aspects, the synthetic image includes an element described by the text prompt, a first attribute represented by the first attribute token, and a second attribute represented by the second attribute token. The first attribute token and the second attribute token comprise learnable tokens corresponding to the first attribute and the second attribute, respectively. Some examples of the method, apparatus, and non-transitory computer readable medium further include obtaining the first attribute token and the second attribute token comprises receiving a user input indicating the first attribute and the second attribute. In some aspects, the first set of layers does not overlap with the second set of layers, and the first set of time-steps does not overlap with the second set of time-steps.

Some examples of the method, apparatus, and non-transitory computer readable medium further include generating the synthetic image comprises performing a reverse diffusion process on a noisy input image, wherein the reverse diffusion process is based on a plurality of time-steps including the first set of time-steps and the second set of time-steps. Some examples of the method, apparatus, and non-transitory computer readable medium further include encoding the text prompt to obtain a text embedding, where the synthetic image is generated based on the text embedding.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIGS. 5-8.

In an example shown in FIG. 1, a reference image and a text prompt are provided to image processing apparatus 110, e.g., via user device 105 and cloud 115. The reference image features a cat with a particular color, style, layout, and the object of interest is the cat itself. The text prompt specifies an element from the text, which is "of a dog". The user also indicates the synthetic image follows an attribute among the attributes of color, style, layout, and the object of the reference image. For example, the user may indicate following the style of the reference image. Image processing apparatus 110 then processes the reference image to capture its stylistic attribute and obtains an image embedding that encodes these characteristics. Also, the image processing apparatus 110 processes the text prompt to produce a text embedding that includes the requested subject transformation from a cat in the reference image to a dog indicated by the text prompt.

In this example, the image processing apparatus 110 synthesizes, via a generative model such as a diffusion model, an output image based on the reference image and text embeddings. The output image depicts a dog characterized by the style of the reference cat image. For example, if the reference cat is portrayed in the style of Vincent van Gogh with a specific layout and color scheme, the output image is of a dog presented with these same stylistic features. Image processing apparatus 110 also ensures the style, color, layout, and presence of the specified subject, now a dog, are coherently integrated, using the reference cat as a stylistic template. In this example, the synthesized dog does not simply replicate the physical form of the cat but adopts the reference image's aesthetic and compositional attributes. The resultant output image is then returned to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., query answering, image editing, relationship detection). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code that is sent to the user device 105 and rendered locally by a browser. The process of using the image processing apparatus 110 is further described with reference to FIG. 2.

Image processing apparatus 110 includes a computer implemented network comprising an image encoder, a text encoder, a multi-modal encoder, and a decoder. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 5-8. Further detail regarding the operation of image processing apparatus 110 is provided with reference to FIGS. 5-8.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
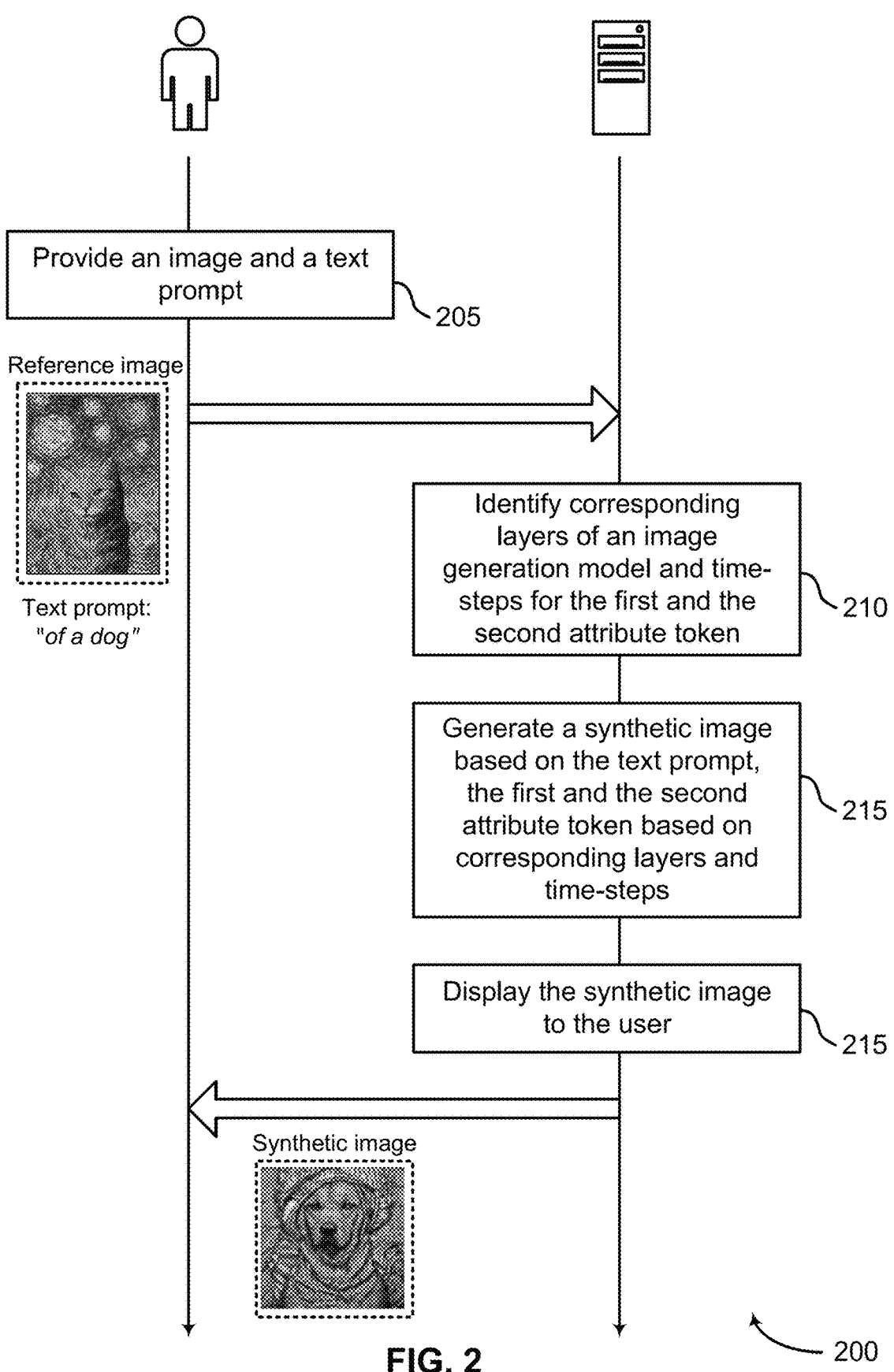
FIG. 2 shows an example of an image generation application according to aspects of the present disclosure.

FIG. 2 shows an example of an image generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides an image and a text prompt. In some cases, the image includes a first and a second attribute token. In some cases, the operations of this step refer to, or may be performed by, a user as described with reference to FIG. 1.

For example, at operation 205, the user initiates the image generation process by providing a reference image alongside a text prompt. The reference image depicts a cat characterized by specific stylistic elements that form the first attribute token, such as the unique color palette and brushstroke technique of Vincent van Gogh. The second attribute token could be the layout or composition of the image, which includes the positioning and posture of the cat. Accompanying the reference image, the user inputs the text prompt "of a dog," setting the task for the system to replicate the attributes of the reference image but with the subject changed to a dog.

At operation 210, the system identifies corresponding layers of an image generation model and time-steps for the first and the second attribute token. In some cases, the operations of this step refer to, or may be performed by, an image processing apparatus as described with reference to FIGS. 5-8.

For example, at operation 210, the system analyzes the provided reference image to identify distinct layers within the image generation model that correspond to the first and second attribute tokens. For example, this step involves mapping the style and object attributes of the reference image to specific layers and time-steps within the model that are responsible for generating those attributes. For example, the system may identify that some layers are pivotal in recreating the style, while other layers influence the object.

At operation 215, the system generates a synthetic image based on the text prompt, the first and the second attribute token based on corresponding layers and time-steps. In some cases, the operations of this step refer to, or may be performed by, an image processing apparatus as described with reference to FIGS. 5-8.

For example, at operation 215, the system proceeds to generate a synthetic image that incorporates the user's specified attributes into the new subject matter indicated by the text prompt and the reference image. The system leverages the identified layers and time-steps to ensure that the first attribute, for example the style, as indicated in the reference image, is mirrored in the rendering the synthetic image. Also, the system ensures that the second attribute, for example the object and in this case a dog indicated by the text prompt, is reflected in the synthetic image.

At operation 220, the system displays the synthetic image to the user. In some cases, the operations of this step refer to, or may be performed by, an image processing apparatus as described with reference to FIGS. 5-8.

For example, at operation 220, the system displays the generated synthetic image to the user. This generated image is a synthetic image of a dog that has been generated to exhibit the distinct style attributes originally depicted in the reference image of the cat. The presentation of the image allows the user to evaluate the effectiveness of the attribute transfer and the overall quality of the synthetic image. For example, when the user wants to make further adjustments, the user may choose to provide a different text prompt or select a different attribute token for generating a different synthetic image.

Figure 3:
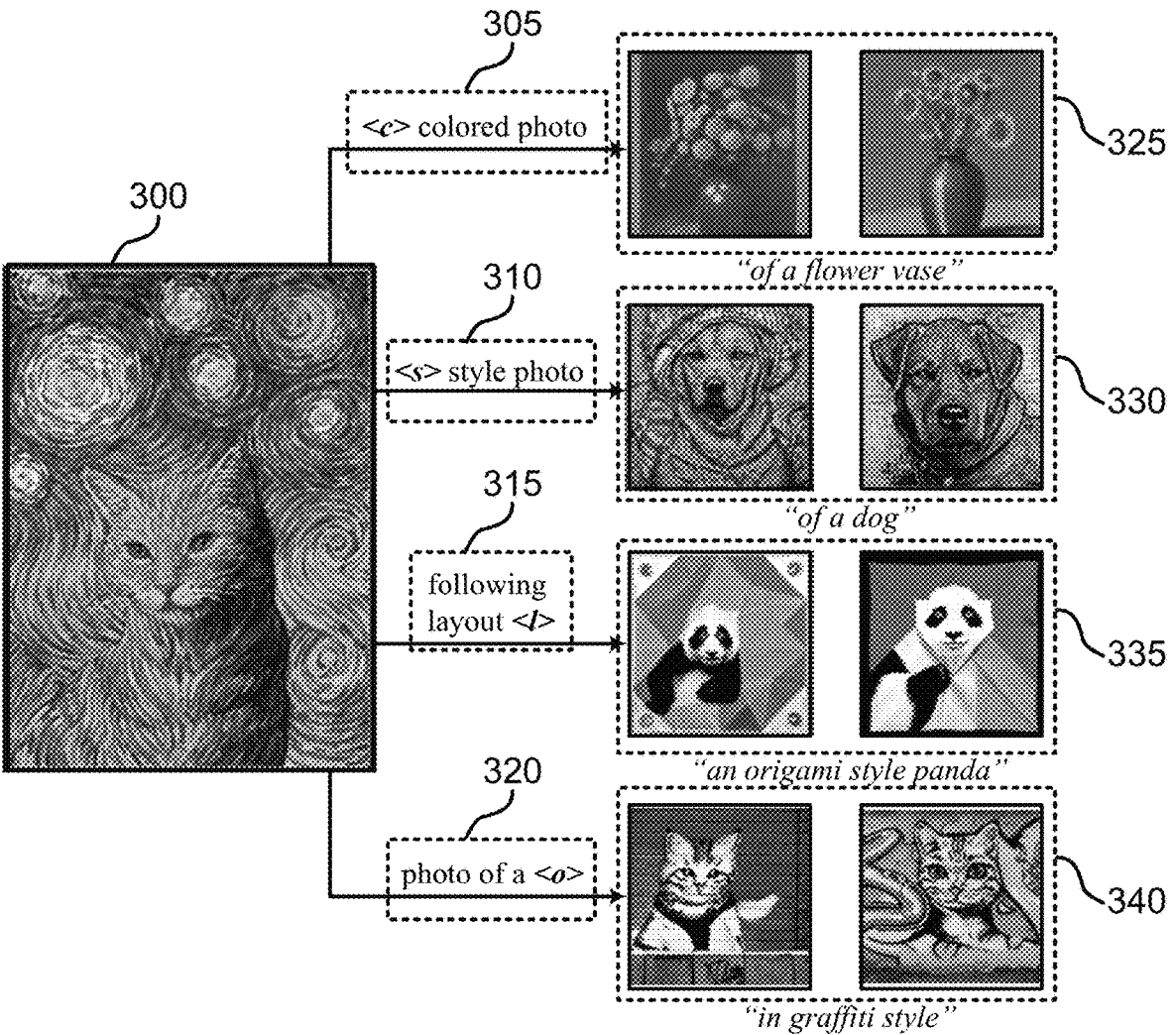
FIG. 3 shows an example of examples of synthetic images using attribute-guided image synthesis according to aspects of the present disclosure.

FIG. 3 shows an example of synthetic images generated using attribute-guided image synthesis according to aspects of the present disclosure. Referring to FIG. 3, reference image 300 is provided to generate synthetic images. Synthetic images are generated based on one or more attributes of the reference image, for example, color, style, layout, or object.

In some examples, the generated synthetic images follow one of the attributes of the reference image, which are color, style, layout, and object. The generated synthetic images may also follow a combination of the attributes. For example, when the user chooses to follow the color of the reference image 300 and provides the text prompt "of a flower vase", synthetic images 325 are generated, which follow the color of the reference image. For example, when the user chooses following the style of the reference image 300, and provides text prompt "of a dog", synthetic images 330 are generated, which follow the style of the reference image 300. For example, when the user chooses to follow the layout of the reference image 300 and provides text prompt "an origami style panda", synthetic images 335 are generated, which follow the layout of the reference image 300. For example, when the user chooses to follow the object of the reference image 300, and provides text prompt "in graffiti style", synthetic images 340 are generated, which have one or more objects that are the same as or similar to the one or more objects of the reference image 300.

FIG. 4 shows an example of a method for conditioning across U-Net layers and denoising time-steps jointly according to aspects of the present disclosure. The present disclosure provides a method for guided conditioning for text-to-image diffusion models. According to some embodiments, an analysis of the attribute distribution during the generation process is conducted, considering both the layer and timestep dimensions. For example, the analysis may be used to identify which layers (for example, within the DDPM model) and timesteps (for example, in the backward process) collaboratively capture attributes (for example, color, style, layout, or object) during image generation.

For example, the U-Net model includes 16 cross-attention layers of various resolutions. These layers are categorized into coarse layers, moderate layers, and fine layers. The denoising timesteps are divided into four stages: (800-1000), (600-800), (200-600), and (0-200). In forward diffusion, it corresponds to the (notation used for denoising timestep stages previously) of the backward denoising process. As a result, the properties of backward denoising stages directly relate to the corresponding forward diffusion stages.

Embodiments of the present disclosure identify the specific layers and time-steps corresponding to the four attributes during the generation process, such as identifying modifications of a specific attribute are mainly determined during specific layers and during specific time-steps while not noticeably influenced during other layers or during other time-steps.

According to embodiments of the present disclosure, to identify the layers and the time-steps corresponding to an attribute, conditioning is added or removed from both timesteps and layers, and the resulting outputs are analyzed. Referring to FIG. 4, results are demonstrated for an image generation based on joint prompting across both layers and the denoising stages. For the final generated image, a red standing cat in oil painting style, the textual conditionings corresponding to each of the key attributes in the prompt (red, standing, cat, and oil painting) were specified only across a subset of layers and only along specific timesteps. For example, despite specifying blue in certain layers, a red colored cat is generated, showing some attributes not evenly influenced by modifications across layers and time-stages.

In the example in FIG. 4, tokens for four attributes are provided. Regarding the color attribute, specifying colors like green and blue in conditioning for fine layers and coarse layers respectively does not impact the generated image which is red. Similarly, colors like white in the later denoising stages of moderate layers do not impact the generated image, and in the example in FIG. 4, an image of a red cat is generated. This suggests that color is captured in the initial denoising stages across the moderate layers.

Referring to FIG. 4, a U-Net comprises 16 cross-attention layers of resolutions 8, 16, 32, and 64. The layers are partitioned into three sets: coarse ($L_6$-$L_9$), moderate ($L_3$-$L_5$ & $L_{10}$-$L_{13}$), and fine ($L_1$-$L_2$ & $L_{14}$-$L_{16}$). The denoising time-steps are partitioned into four stages: $t_1$, $t_2$, $t_3$ and $t_4$. The layers and the time-steps and layers are analyzed to identify where the four attributes are captured during the generation process. For example, embodiments of the present disclosure add or remove conditioning from both time-steps and layers and analyze the output.

In FIG. 4, synthetic image 405 is generated. The synthetic image 405 is a red standing cat in oil painting style. Referring to FIG. 4, to generate synthetic image 405, the textual conditionings corresponding to each of key attributes in the prompt red, standing, cat, and oil painting) were specified only across a subset of layers and only along specific timesteps. For example, despite specifying blue in $L_1$-$L_2$ & $L_{14}$-$L_{16}$ layers, including in dimensions 410 ("blue, lizard, sitting, graffiti style"), a red colored cat is generated, suggesting the existence of some patterns in how these attributes are distributed across layers and time stages. Specifically, regarding the color attribute in the synthetic image 405, specifying colors like green and blue in conditioning for fine ($L_1$-$L_2$ & $L_{14}$-$L_{16}$) and coarse layers ($L_6$-$L_9$) respectively has no impact on the generated image that is red. Similarly, colors like white in the later denoising stages ($t_3$, $t_4$) of moderate layers ($L_3$-$L_5$ & $L_{10}$-$L_{13}$) has no impact on the final generation and we indeed get a red cat. This indicates that color is captured in the initial denoising stages ($t_1$, $t_2$) across the moderate layers ($L_3$-$L_5$ & $L_{10}$-$L_{13}$).

For example, regarding the style of synthetic image 405, specifying graffiti and across coarse ($L_6$-$L_9$) and fine ($L_1$-$L_2$ & $L_{14}$-$L_{16}$) layers, and graffiti towards the later denoising stages ($t_3$, $t_4$), including in dimensions 415 ("blue, lizard, sitting, graffiti style") has no impact on the generated image. The synthetic image 405 is still based on oil painting from ($t_1$, $t_2$) across ($L_3$-$L_5$ & $L_{10}$-$L_{13}$).

For example, regarding the object of synthetic image 405, a cat is generated despite specifying cow in the initial and later stages ($t_1$, $t_4$), suggesting object is captured in the middle stages ($t_2$, $t_3$). Coarse layers ($L_6$-$L_9$) are responsible because specifying other types like lizard in other layers have no impact.

For example, regarding the layout of synthetic image 405, changing the layout aspects from standing to sitting after the first denoising stage, including in dimensions 420 ("blue, lizard, sitting, graffiti style"), has no impact on the posture of the cat being generated. This indicates layout is captured in the initial stages ($t_1$). Moreover, in this example, the layers with resolution 16 are responsible for the layout attribute. In particular, layout properties are mainly captured across the initial few timesteps in layers $L_6$, $L_8$, and $L_9$.

Image Generation Apparatus

In FIGS. 5-9, an apparatus for image processing is described. One or more aspects of the apparatus include at least one processor; at least one memory storing instruction executable by the at least one processor; and an image generation model comprising parameters stored in the at least one memory and trained to generate synthetic images comprising a first attribute and a second attribute by providing a first attribute token to a first set layers of the image generation model during a first set of time-steps and providing a second attribute token to a second set of layers of the image generation model during a second set of time-steps.

In some aspects, the image generation model comprises a U-Net architecture, and wherein the first set of layers and the second set of layers comprise different layers of the U-Net architecture.

In some aspects, the first attribute comprises a color attribute or a style attribute and the first set of layers comprises moderate resolution layers of the image generation model.

In some aspects, the second attribute comprises an object attribute or a layout attribute and the second set of layers comprises coarse resolution layers of the image generation model.

In some aspects, the first attribute comprises a color attribute, a style attribute, or a layout attribute, and the first set of time-steps comprises an initial set of time-steps.

In some aspects, the second attribute comprises an object attribute and the second set of time-steps comprises a middle set of time-steps.

Figure 5:
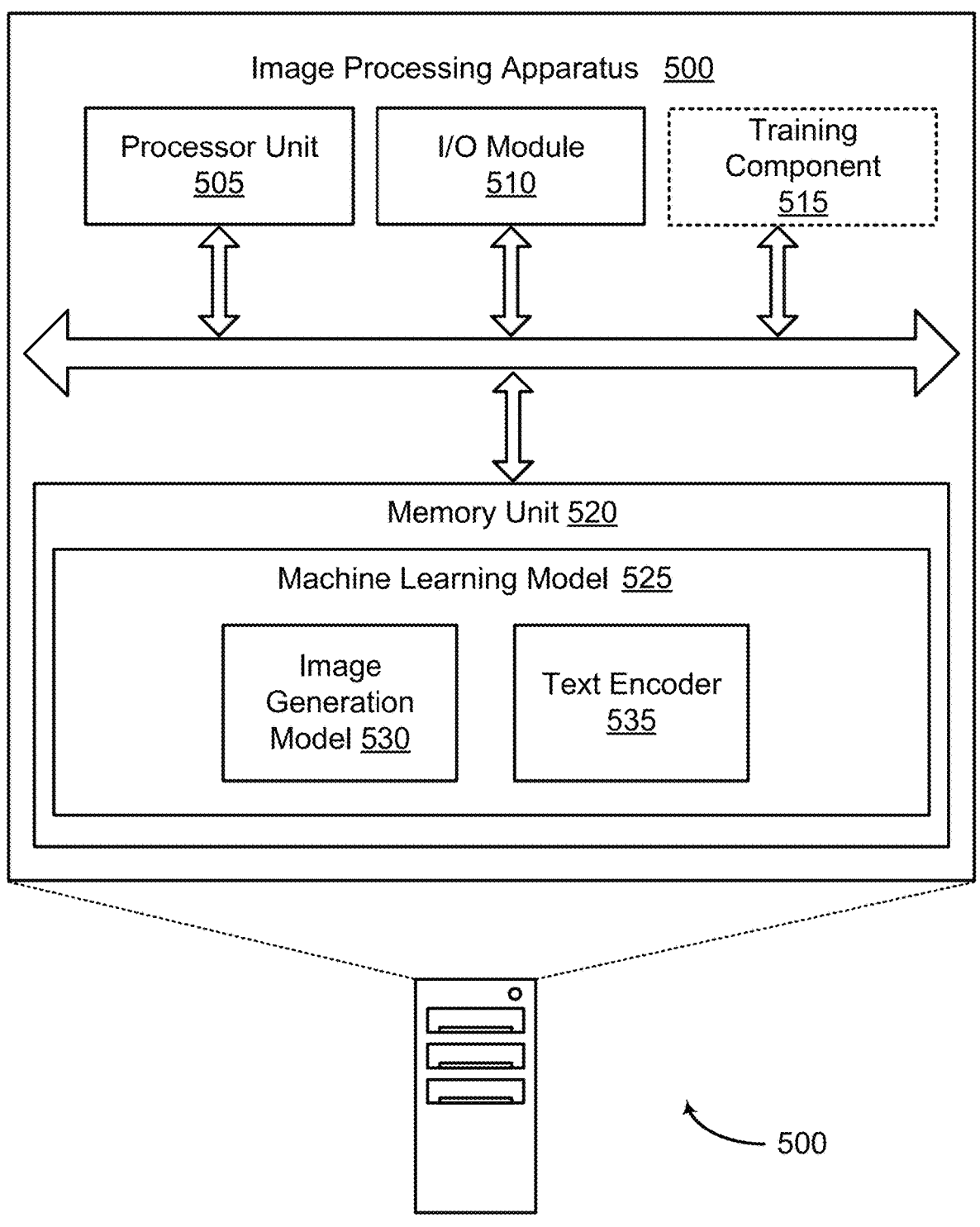
FIG. 5 shows an example of an image processing apparatus according to aspects of the present disclosure.

FIG. 5 shows an example of an image generation apparatus 500 according to aspects of the present disclosure. Image generation apparatus 500 is an example of, or includes aspects of, the corresponding element described with reference to FIG. 1. In one aspect, image generation apparatus 500 includes processor unit 505, I/O module 510, training component 515, memory unit 520, machine learning model 525 including image generation model 530 and text encoder 535.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 520 to perform various functions. In some aspects, processor unit 505 includes special purpose components for modem processing, baseband processing, digital signal processing, or transmission processing. According to some aspects, processor unit 505 comprises the one or more processors described with reference to FIG. 15.

Memory unit 520 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 520 includes a basic input/output system (BIOS) that controls basic hardware or software operations, such as an interaction with peripheral components or devices. In some cases, memory unit 520 includes a memory controller that operates memory cells of memory unit 520. For example, the memory controller may include a row decoder, column decoder, or both. In some cases, memory cells within memory unit 520 store information in the form of a logical state. According to some aspects, memory unit 520 comprises the memory subsystem described with reference to FIG. 15.

According to some aspects, image generation apparatus 500 uses one or more processors of processor unit 505 to execute instructions stored in memory unit 520 to perform functions described herein. For example, in some cases, image generation apparatus 500 obtains a prompt. In some cases, the prompt comprises a text prompt.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, machine learning model 525 identifies a first set of layers of an image generation model and a first set of time-steps for the first attribute token and a second set of layers of the image generation model and a second set of time-steps for the second attribute token. In some examples, machine learning model 525 performs a forward diffusion process on a training image to obtain a noisy input image. In some examples, machine learning model 525 performs a reverse diffusion process on the noisy image to obtain a predicted image.

According to some aspects, training component 515 obtains training data including a first attribute token representing a first attribute, and a second attribute token representing a second attribute. In some examples, training component 515 trains the image generation model to generate synthetic images including the first attribute and the second attribute by providing the first attribute token to the first set layers of the image generation model during the first set of time-steps and providing the second attribute token to the second set of layers of the image generation model during the second set of time-steps. In some examples, training component 515 compares the predicted image with the training image. In some examples, training component 515 trains the image generation model includes training the image generation model to generate synthetic images including a color attribute, an object attribute, a style attribute, and a layout attribute. In some examples, training component 515 trains the image generation model includes computing a color-style disentanglement loss. In some examples, training component 515 obtains the training data further includes optimizing the first attribute token to represent the first attribute and optimizing the second attribute token to represent the second attribute. In some examples, training component 515 obtains the training data further includes obtaining a training image and a text prompt describing the training image, where the image generation is trained based on the training image and the text prompt.

Figure 6:
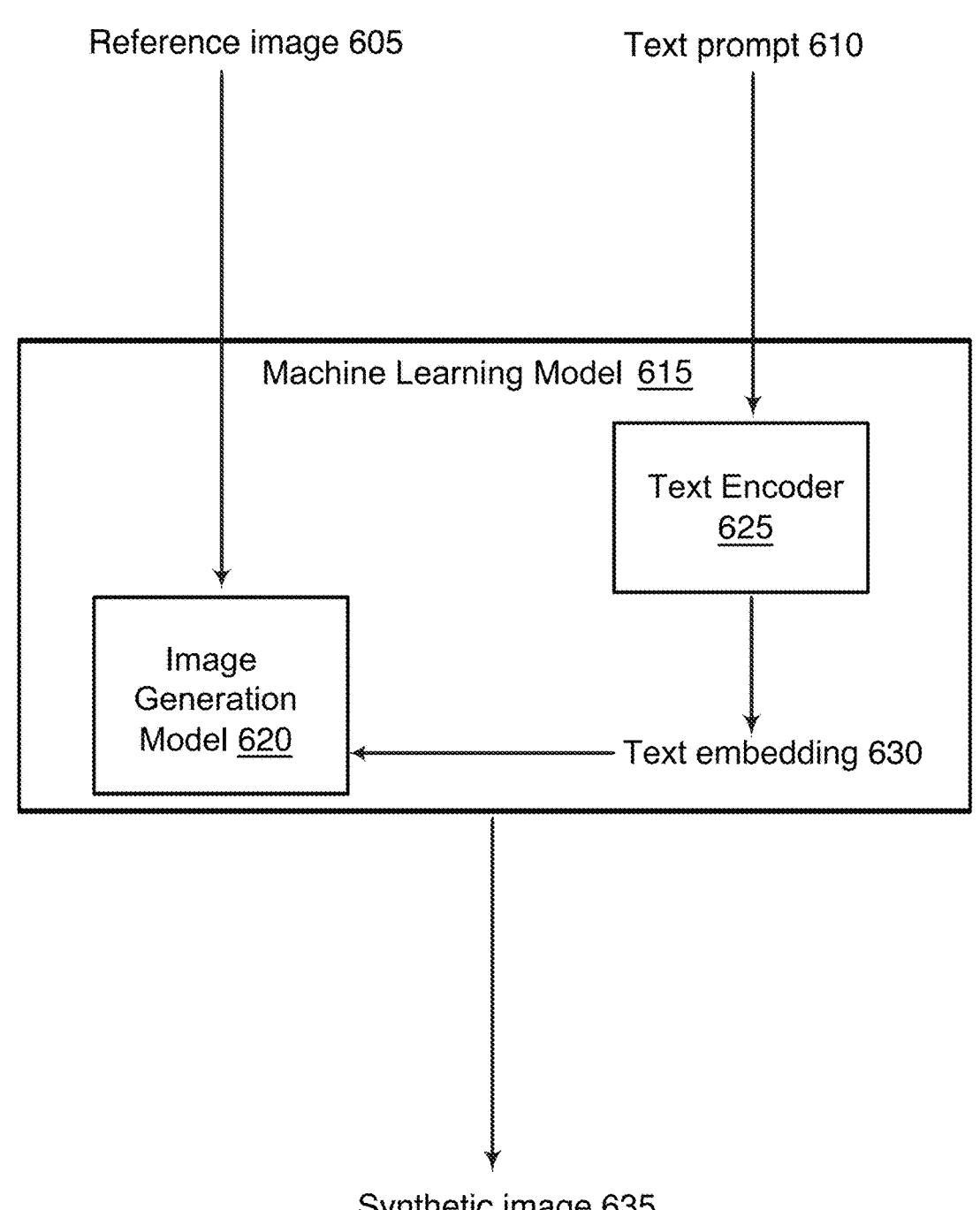
FIG. 6 shows an example of a machine learning model generating a synthetic image according to the embodiments of the present disclosure.

FIG. 6 shows an example of a machine learning model generating a synthetic image according to embodiments of the present disclosure. Referring to FIG. 6, machine learning model 615 generates synthetic image 630 based on reference image 650 and text prompt 610. Machine learning model 615 includes image generation model 620 and text encoder 625. Text encoder 625 takes text prompt 610 as input and generates text embedding 630. The image generation model 620 generates synthetic image 635 based on the text embedding 630 and reference image 605.

The image generation model 620 utilizes a diffusion process to synthesize image 635. Initially, the model 620 introduces a series of noise variables to reference image 605 over multiple steps, creating a sequence of increasingly noisy images. This progression of adding noise is a forward diffusion process, which transitions the original reference image into a state of high entropy. Each step corresponds to a time-step in the diffusion model and is quantified by the model's parameters.

Subsequent to the forward diffusion, the image generation model 620 embarks on a reverse diffusion process. Starting with the noisiest state, the model 620 incrementally reduces noise from the image during reverse diffusion steps. At each reverse time-step, the model consults the text embedding 630, which encapsulates the characteristics to be manifested in the synthetic image, as indicated by text prompt 610. The reverse diffusion process is guided by the text embedding 630, ensuring that the final image aligns with the user's input while retaining the stylistic and content attributes of the reference image 605.

During this reverse diffusion, the model 620 systematically refines the image, enhancing fidelity to the target attributes and coherence with the input text prompt 610. The model 620 integrates the text embedding 630 at strategic layers and time-steps, effectively molding the synthetic image to feature the dog subject in the style conveyed by the reference image 605. The reverse diffusion concludes when the image is fully transformed, resulting in the generation of synthetic image 635, which exhibits the fusion of the textual input with the visual cues from the reference image.

Figure 7:
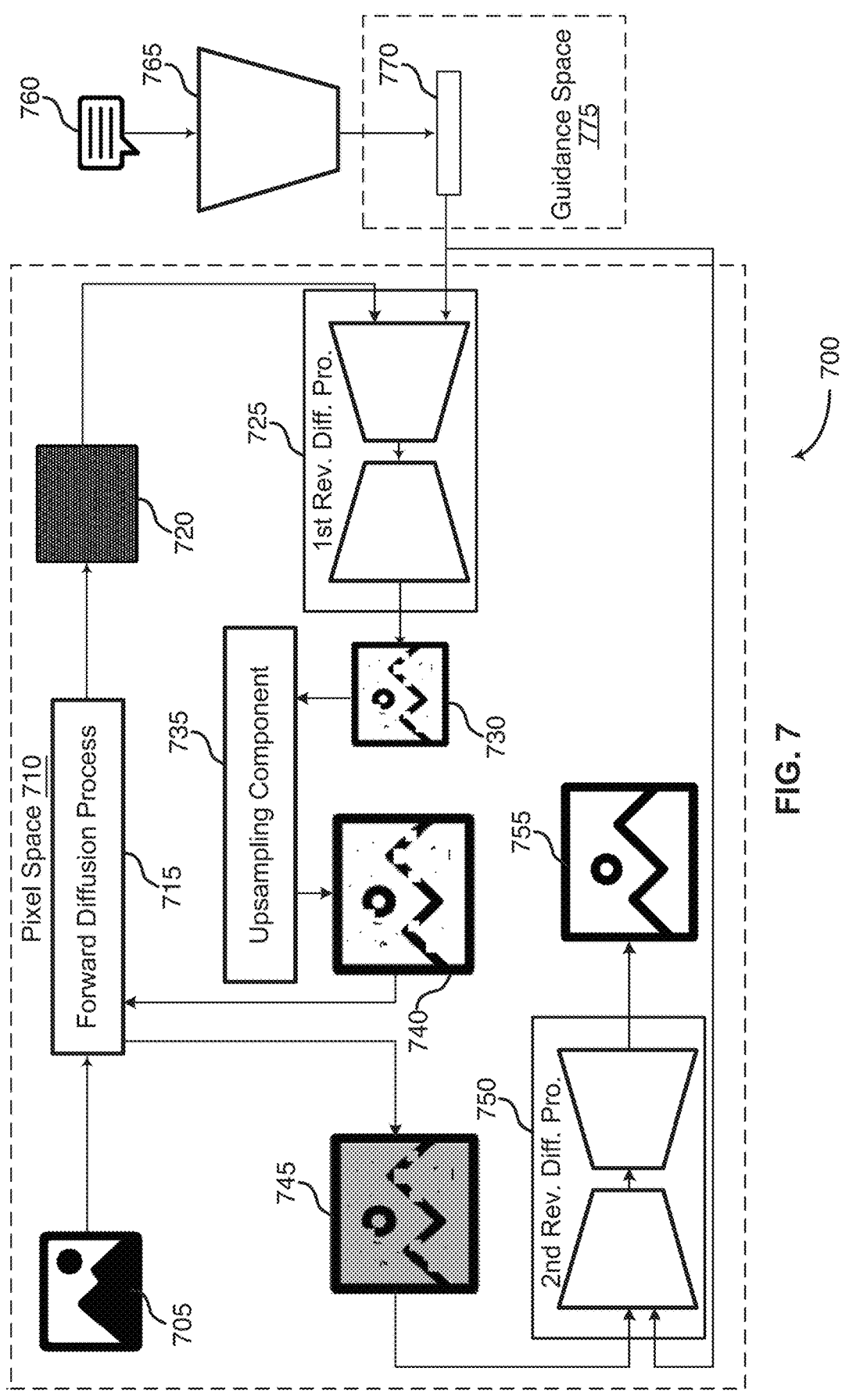
FIG. 7 shows an example of a guided diffusion architecture according to aspects of the present disclosure.

FIG. 7 shows an example of a guided diffusion architecture 700 according to aspects of the present disclosure. Diffusion models are a class of generative ANNs that can be trained to generate new data with features similar to features found in training data. In particular, diffusion models can be used to generate novel images. Diffusion models can be used for various image generation tasks, including image superresolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, as in pixel diffusion, or to image features generated by an encoder, as in latent diffusion.

For example, according to some aspects, forward diffusion process 715 gradually adds noise to original image 705 to obtain noise images 720 at various noise levels. In some cases, forward diffusion process 715 is implemented by a forward diffusion component (such as the forward diffusion component described with reference to FIGS. 5 and 8).

According to some aspects, first reverse diffusion process 725 gradually removes the noise from noise images 720 at the various noise levels at various diffusion steps to obtain predicted denoised image 730. In some cases, a predicted denoised image 730 is created from each of the various noise levels. For example, in some cases, at each diffusion step of first reverse diffusion process 725, a first diffusion model (such as the first diffusion model described with reference to FIGS. 5 and 8) makes a prediction of a partially denoised image, where the partially denoised image is a combination of a predicted denoised image (e.g., a predicted final output) and noise for that diffusion step. Therefore, in some cases, each predicted denoised image can be thought of as the first diffusion model's prediction of a final noiseless output at each diffusion step, and each predicted denoised image 730 can therefore be thought of as an "early" prediction of a final output at a respective diffusion step of first reverse diffusion process 725.

According to some aspects, a predicted denoised image 730 is provided to upsampling component 735 (such as the upsampling component described with reference to FIGS. 5 and 8). In some cases, upsampling component 735 upsamples the predicted denoised image 730 to output upsampled denoised image 740 at a higher resolution. In some cases, forward diffusion process 715 gradually adds isotropic noise to upsampled denoised image 740 at various noise levels to obtain intermediate input images 745. In some cases, an intermediate input image 745 can be thought of as an upscaled version of the partially denoised image at the time step of first reverse diffusion process 725 corresponding to the predicted denoised image 730, where the intermediate input image 745 includes a Gaussian distribution of noise.

According to some aspects, second reverse diffusion process 750 gradually removes noise from intermediate noise images 745 to obtain output image 755 at the higher resolution. In some cases, an output image 755 is created from each of the various noise levels.

In some cases, each of first reverse diffusion process 725 and second reverse diffusion process 750 are implemented via a U-Net ANN (such as the U-Net architecture described with reference to FIG. 7). Forward diffusion process 715, first reverse diffusion process 725, and second reverse diffusion process 750 are examples of, or include aspects of, the corresponding elements described with reference to FIG. 10.

In some cases, each of first reverse diffusion process 725 and second reverse diffusion process 750 are guided based on a prompt 760, such as a text prompt, an image, a layout, a segmentation map, etc. Prompt 760 can be encoded using encoder 765 (in some cases, a multi-modal encoder) to obtain guidance features 770 (e.g., a prompt embedding) in guidance space 775.

According to some aspects, guidance features 775 are respectively combined with noise images 720 and intermediate input images 745 at one or more layers of first reverse diffusion process 720 and second reverse diffusion process 750 to guide predicted denoised image 730 and output image 755 towards including content described by prompt 760. For example, guidance features 770 can be respectively combined with noise images 720 and intermediate input images 745 using cross-attention blocks within first reverse diffusion process 725 and second reverse diffusion process 750. In some cases, guidance features 770 can be weighted so that guidance features 770 have a greater or lesser representation in predicted denoised image 730 and output image 755.

Cross-attention, also known as multi-head attention, is an extension of the attention mechanism used in some ANNs for NLP tasks. In some cases, cross-attention enables each of first reverse diffusion process 725 and second reverse diffusion process 750 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing each of first reverse diffusion process 725 and second reverse diffusion process 750 to better understand the context and generate more accurate and contextually relevant outputs.

As shown in FIG. 7, guided diffusion architecture 700 is implemented according to a pixel diffusion model. According to some aspects, guided diffusion architecture 700 is implemented according to a latent diffusion model. In a latent diffusion model, forward and reverse diffusion processes occur in a latent space, rather than a pixel space.

For example, in some cases, an image encoder encodes original image 705 as image features in a latent space. In some cases, forward diffusion process 715 adds noise to the image features, rather than original image 705, to obtain noisy image features. In some cases, first reverse diffusion process 725 gradually removes noise from the noisy image features (in some cases, guided by guidance features 770) to obtain predicted denoised image features at an intermediate step of first reverse diffusion process 725. In some cases, an upsampling component upsamples the predicted denoised image features to obtain upsampled image features. In some cases, forward diffusion process 715 gradually adds noise to the upsampled image features to obtain intermediate image features. In some cases, second reverse diffusion process 750 gradually removes noise from the intermediate image features to obtain output image features.

In some cases, an image decoder decodes the output image features to obtain output image 755 in pixel space 710. In some cases, as a size of image features in a latent space can be significantly smaller than a resolution of an image in a pixel space (e.g., 32, 64, etc. versus 256, 512, etc.), encoding original image 705 to obtain the image features can reduce inference time by a large amount.

Figure 8:
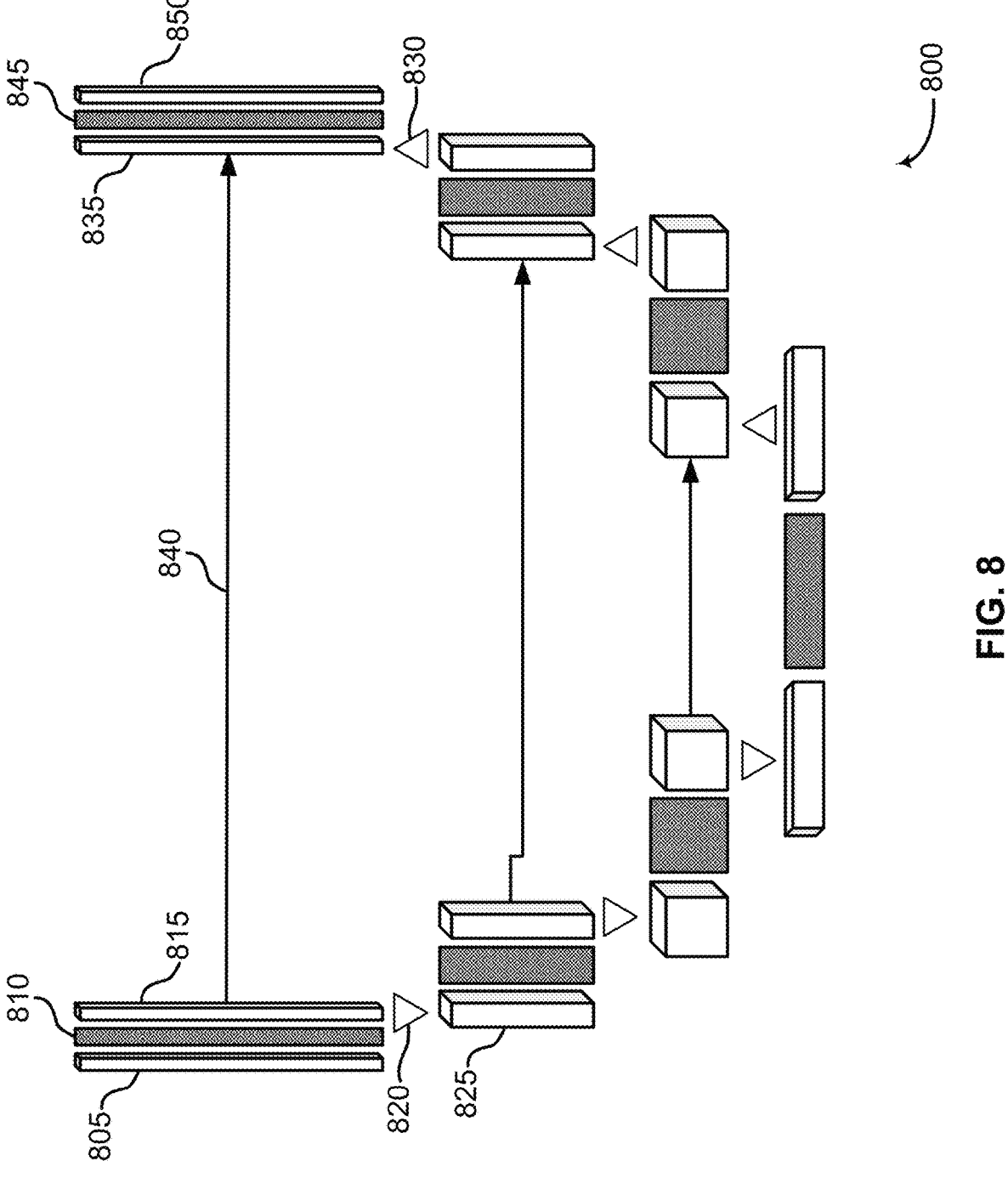
FIG. 8 shows an example of a U-Net according to aspects of the present disclosure.

FIG. 8 shows an example of a U-Net 800 according to aspects of the present disclosure. According to some aspects, a diffusion model comprises an ANN architecture known as a U-Net. In some cases, U-Net 800 implements reverse diffusion processes described with reference to FIG. 7.

According to some aspects, U-Net 800 receives input features 805, where input features 805 include an initial resolution and an initial number of channels, and processes input features 805 using an initial neural network layer 810 (e.g., a convolutional neural network layer) to produce intermediate features 815.

In some cases, intermediate features 815 are then down-sampled using a down-sampling layer 820 such that down-sampled features 825 have a resolution less than the initial resolution and a number of channels greater than the initial number of channels.

In some cases, this process is repeated multiple times, and then the process is reversed. For example, down-sampled features 825 are up-sampled using up-sampling process 830 to obtain up-sampled features 835. In some cases, up-sampled features 835 are combined with intermediate features 815 having a same resolution and number of channels via skip connection 840. In some cases, the combination of intermediate features 815 and up-sampled features 835 are processed using final neural network layer 845 to produce output features 850. In some cases, output features 850 have the same resolution as the initial resolution and the same number of channels as the initial number of channels.

According to some aspects, U-Net 800 receives additional input features to produce a conditionally generated output. In some cases, the additional input features include a vector representation of an input prompt. In some cases, the additional input features are combined with intermediate features 815 within U-Net 800 at one or more layers. For example, in some cases, a cross-attention module is used to combine the additional input features and intermediate features 815.

Image Generation Process

FIG. 9 shows an example of method 900 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a text prompt, a first attribute token, and a second attribute token. In some cases, the operations of this step refer to, or may be performed by, an image generation model as described with reference to FIGS. 5-8.

For example, at operation 905, the system retrieves the text prompt and selects two attribute tokens, the first and second attribute tokens. The two attribute tokens are used in directing the image synthesis process, each influencing a different attribute that the output image will reflect.

At operation 910, the system identifies a first set of layers of an image generation model and a first set of time-steps for the first attribute token and a second set of layers of the image generation model and a second set of time-steps for the second attribute token. In some cases, the operations of this step refer to, or may be performed by, an image generation model as described with reference to FIGS. 5-8.

For example, at operation 910, the system selects a first set of layers within the image generation model that are used for capturing and interpreting characteristics associated with the first attribute token. This might involve layers that specialize in textural detail or color patterns. Also, the system identifies a first set of time-steps when these specific layers are effective in processing the first attribute. Similarly, the system selects a second set of layers based on their capacity to reflect attributes relevant to the second attribute token which could involve the delineation and arrangement of objects within the scene. It also determines a second set of time-steps for these layers to operate effectively.

At operation 915, the system generates, using the image generation model, a synthetic image based on the text prompt, the first attribute token, and the second attribute token by providing the first attribute token to the first set layers of the image generation model during the first set of time-steps and providing the second attribute token to the second set of layers of the image generation model during the second set of time-steps. In some cases, the operations of this step refer to, or may be performed by, an image generation model as described with reference to FIGS. 5-8.

For example, at operation 915, the system guides the image generation model to generate the synthetic image, with a focus on the first attribute token being processed by the first set of layers during the designated first set of time-steps. Consequently, the first attribute is integrated into the image with high fidelity. Also, the system causes the second attribute token to be processed by the second set of layers at the corresponding second set of time-steps, where modifications of the second attribute is dependent on the corresponding second set of time-steps. By providing the first and second attribute tokens to their respective sets of layers and corresponding time-steps, the image generation model can construct a synthetic image that not only reflects the specified attributes but also aligns closely with the textual narrative provided in the prompt.

In some examples, the system may choose attribute tokens from a set that includes color, object, style, and layout types. The first attribute token could represent a color attribute from the reference image, while the second attribute token might correspond to an object attribute that depicts a particular item within the image.

In some examples, the synthetic image is generated to include elements from the text prompt, with the first attribute represented by the first attribute token, and the second attribute represented by the second attribute token. For example, if the text prompt specifies a "garden," the system applies the first attribute token for color to capture the greenery and the second token for object to incorporate elements such as plants or flowers.

In some examples, the method assigns the first and second attribute tokens to different sets of layers within the model. This non-overlapping assignment allows for a clear and controlled modulation of the resulting image, with one set of layers influencing style attributes and another set modulating color attributes.

In some examples, generating the synthetic image involves a reverse diffusion process applied to a noisy image. This reverse process takes place over several time-steps, guided by the first set of attribute tokens and then by the second set, thereby constructing the image details in a controlled sequence.

In some examples, the text prompt undergoes an encoding process to produce a text embedding. The generation of the synthetic image is then based on this text embedding, aligning the final product with the textual description as well as the visual attributes indicated by the attribute tokens.

FIG. 10 shows an example of a method for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains a text prompt, a first attribute token, and a second attribute token, including receiving a user input indicating the first attribute and the second attribute. In some cases, the operations of this step refer to, or may be performed by, an image generation model as described with reference to FIGS. 5-8.

For example, at operation 1005, the system begins by acquiring inputs for image synthesis. This includes receiving a text prompt that serves as a narrative guide for the desired image, as well as a reference image including a first and a second attribute token. For example, these attribute tokens are identified through user input, where the user specifies desired attributes for the image. The system captures these user-defined attributes as tokens that will direct the synthesis process in generating images that embody these specified characteristics.

At operation 1010, the system generates, using the image generation model, a synthetic image based on the text prompt. In some cases, the operations of this step refer to, or may be performed by, an image generation model as described with reference to FIGS. 5-8.

For example, at operation 1010, the system proceeds to utilize the image generation model to create a synthetic image. This process is anchored by the earlier received text prompt. For example, the generation model leverages learned correlations between text and visual content to initiate the image generation.

At operation 1015, the system includes in the synthetic image an element described by the text prompt, a first attribute represented by the first attribute token, and a second attribute represented by the second attribute token. In some cases, the operations of this step refer to, or may be performed by, an image generation model as described with reference to FIGS. 5-8.

For example, at operation 1015, the text prompt's descriptive elements are visibly embodied in the image. Additionally, the first attribute, encapsulated by the first attribute token, and the second attribute, encapsulated by the second attribute token, are both prominently featured. The system integrates these attributes into the image to make the final synthetic output visually manifest the text-described element along with the user-selected first and second attributes. The system thus generates a synthetic image that is a cohesive visual representation that includes distinct elements as dictated by the input.

Training

Figure 11:
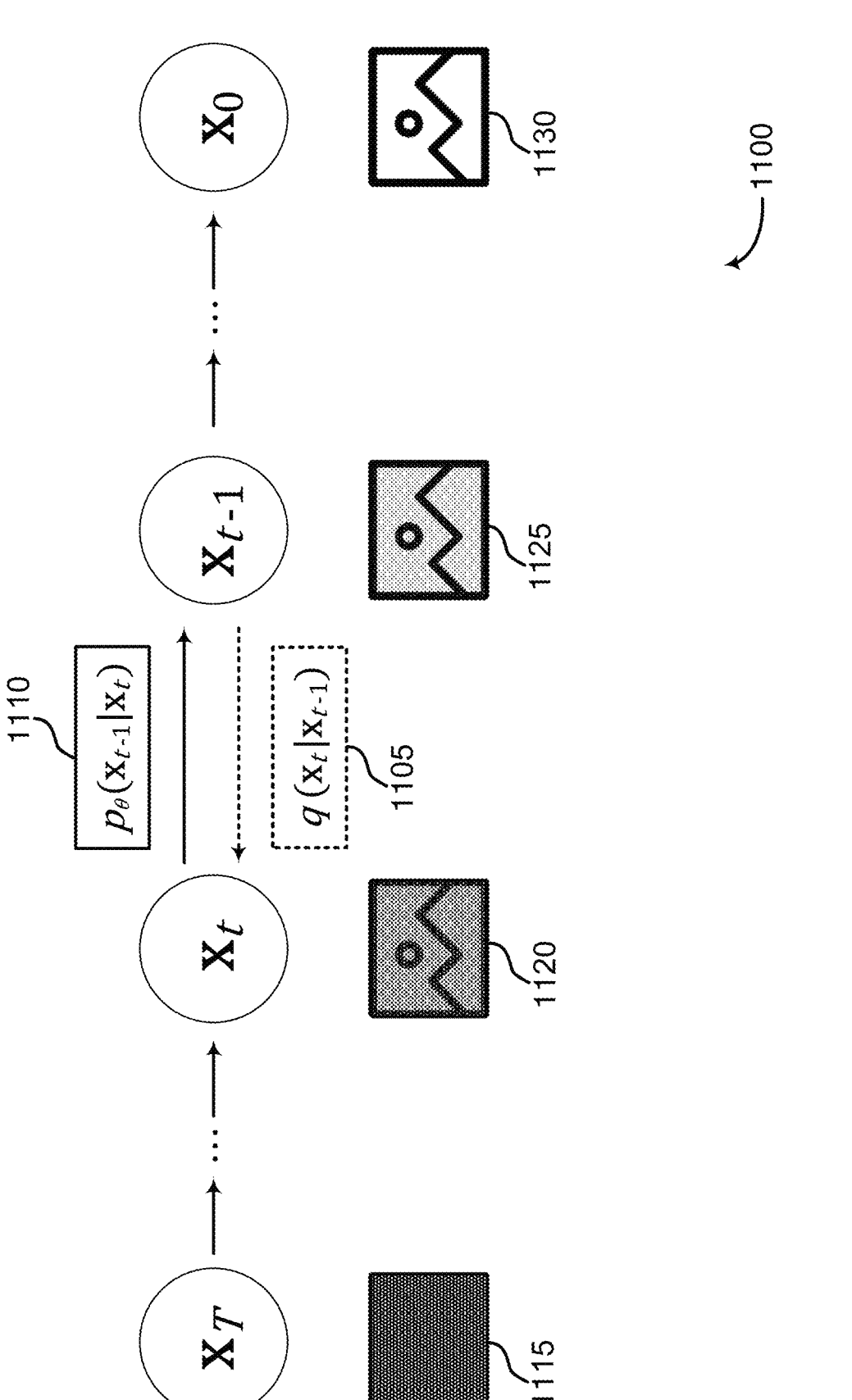
FIG. 11 shows an example of a method for image processing according to aspects of the present disclosure.

FIG. 11 shows an example of diffusion processes according to aspects of the present disclosure. The example shown includes forward diffusion process 1105 (such as the forward diffusion process described with reference to FIG. 7) and reverse diffusion process 1110 (such as the first reverse diffusion process and the second reverse diffusion process described with reference to FIG. 7). In some cases, forward diffusion process 1105 adds noise to an image (or image features in a latent space). In some cases, reverse diffusion process 1110 denoises the image (or image features in the latent space) to obtain a denoised image.

According to some aspects, a forward diffusion component uses forward diffusion process 1005 to iteratively add Gaussian noise to an input at each diffusion step t according to a known variance schedule $0 < \beta_1 < \beta_2 < \ldots < \beta_T < 1$:

$$q(x_t \mid x_{t-1}) = \mathcal{N}\left(x_t; \sqrt{1 - \beta_t}\, x_{t-1}, \beta_t I\right) \qquad (1)$$

According to some aspects, the Gaussian noise is drawn from a Gaussian distribution with mean $\mu_t = \sqrt{1-\beta_t}\, x_{t-1}$ and variance $\sigma^2 = \beta_t \geq 1$ by sampling $\delta \cdot \mathcal{N}(0, I)$ and setting $x_t = \sqrt{1-\beta_t}\, x_{t-1} + \sqrt{\beta_t}\, \epsilon$. Accordingly, beginning with an initial input $x_0$, forward diffusion process 1005 produces $x_1, \ldots, x_t, \ldots x_T$, where $x_T$ is pure Gaussian noise.

In some cases, an observed variable $x_0$ (such as original image 1130) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T} \mid x_0)$.

According to some aspects, during reverse diffusion process 1110, a diffusion model gradually removes noise from $x_T$ to obtain a prediction of the observed variable $x_0$ (e.g., a representation of what the diffusion model thinks the original image 1130 should be). In some cases, the prediction is influenced by a guidance prompt or a guidance vector (for example, a prompt or a prompt embedding described with reference to FIG. 6). A conditional distribution $p(x_{t-1} \mid x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1} \mid x_t)$ of the conditional distribution $p(x_{t-1} \mid x_t)$:

$$q(x_t \mid x_{t-1}) = \mathcal{N}\left(x_t; \sqrt{1 - \beta_t}\, x_{t-1}, \beta_t I\right) \qquad (2)$$

In some cases, a mean of the conditional probability distribution $p_\theta(x_{t-1} \mid x_t)$ is parameterized by $\mu_\theta$ and a variance of the conditional probability distribution $p_\theta(x_{t-1} \mid x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1110 with noisy data $x_T$ (such as noisy image 1115). According to some aspects, the diffusion model iteratively denoises the noisy data $x_T$ to obtain the conditional probability distribution $p_\theta(x_{t-1} \mid x_t)$. For example, in some cases, at each step t−1 of reverse diffusion process 1110, the diffusion model takes $x_t$ (such as first intermediate image 1120) and t as input, where t represents a step in a sequence of transitions associated with different noise levels, and iteratively outputs a prediction of $x_{t-1}$ (such as second intermediate image 1125) until the noisy data $x_T$ is reverted to a prediction of the observed variable $x_0$ (e.g., a predicted image for original image 1130). According to some aspects, a joint probability of a sequence of samples in the Markov chain is determined as a product of conditionals and a marginal probability:

$$p_\theta(x_{t-1} \mid x_t) = \mathcal{N}\left(x_{t-1}; \mu_\theta(x_t, t), \sum\nolimits_\theta(x_t, t)\right) \qquad (3)$$

In some cases, $p(x_T) = \mathcal{N}(x_T; 0, I)$ is a pure noise distribution, as reverse diffusion process 1110 takes an outcome of forward diffusion process 1105 (e.g., a sample of pure noise $x_T$) as input, and $\Pi_{t=1}^{T}\, p_\theta(x_{t-1} \mid x_t)$ represents a sequence of Gaussian transitions corresponding to a sequence of addition of Gaussian noise to a sample.

FIG. 12 shows an example of a method for computing the input conditioning according to aspects of the present disclosure. Referring to FIG. 12, the input prompt is translated to conditioning vector. For example, the $i \in [1, 5]$ corresponds to the five-layer subsets as in FIG. 12, whereas $j \in [1, 4]$ corresponds to the four timestep stages. Consequently, $P_{ij}$ comprises of a set of 4 different prompts, one for each timestep stage, where each of further comprises 5 prompts for conditioning each layer subset differently.

Referring to FIG. 12, learnable tokens <c>, <o>, <s> and <l> are included in the input prompt across the multiple layers and timestep stages. For example, the object attribute gets captured in the coarse layers ($L_6$-$L_9$) and the middle $\$t_2$, $\$t_3$ backward denoising stages. Consequently, the token <o> may be designed to condition only the coarse layers and the forward $t_2'$, $t_3'$ diffusion stages. For example, during sampled timestep $t \in t_3'$ in the forward diffusion process, <o> may influence the final conditioning vector across the coarse U-Net layers. Similar observations can be derived from FIG. 12 for <c>, <s> and <l> tokens. Subsequently, during inversion, for a particular backward pass, depending on the sampled timestep, the embeddings corresponding to only active tokens from FIG. 12 can be optimized.

Embodiments of the present disclosure provide the MATTE algorithm. MATTE's learning objective includes of three parts. The initial component is the standard reconstruction loss, where the function represents learnable embeddings for a subset of the tokens, depending on the sampled timestep in the forward diffusion process:

$$L_R = E_{z \sim E(I), p, \epsilon \sim N(0,1), t} \left[ \| \epsilon - \epsilon_\theta(z_t, t, p_j) \|_2^2 \right] \quad (4)$$

Here $p_j$ comprises learnable embeddings for a subset of the <c>, <o>, <s> and <l> tokens depending on the sampled timestep $t \in [0, 1000]$ in the forward diffusion process. Further, since color and style attributes are captured across similar layers and timestep stages, an additional color-style disentanglement loss is provided to facilitate the disentanglement of these tokens:

$$L_{cs} = \| c - s \|_2^2 - \| c_{gt} - s \|_2^2 \quad (5)$$

For the encoded vector of token c, it's paired with s, the encoded vector for a randomly chosen style from a set of potential styles such as watercolor, graffiti, oil painting, and others. Additionally, c is also associated with the CLIP embedding 1205 of some of the ground truth colors in the reference image. Encodings 1210 are generated based on $P_{ij}$, where i=[1, 5] and j=j', which is one of the 4 stages as per sampled t.

Here c is the encoded vector of token <c>, s is the encoded vector for any randomly chosen style from a set of 30 styles like watercolor, graffiti, oil painting, and $c_{gt}$ is the CLIP embedding 1205 of all the ground truth colors in the reference image which may be extracted using some datasets or libraries. The underlying intuition is to align the learned embedding cc for token c close to c by ensuring both are equidistant from s. This process make c's embedding closer to the CLIP feature space of colors, making it distinct from the embedding for s.

Moreover, embodiments of the present disclosure ascertain, from the analysis and visualizations, that object and layout information are captured by the same set of coarse U-Net layers. To further distinguish between object and layout tokens, a regularization is proposed for the learned token for layout. This regularization ensures that the layout token respects the class of the object depicted in the reference image. This is achieved by computing the ground-truth class label's CLIP vector and aligning it closely with the layout token's vector. This is represented by:

$$L_O = \| o - o_{gt} \|_2^2 \quad (6)$$

Here o is the learned vector for token <o> and $o_{gt}$ is the ground truth. The overall loss function for MATTE is represented as the following, where $\lambda_{CS} = \lambda_O = 0.1$:

$$L_{inv} = L_R + \lambda_{CS} L_{CS} + \lambda_O L_O \quad (7)$$

Figure 14:
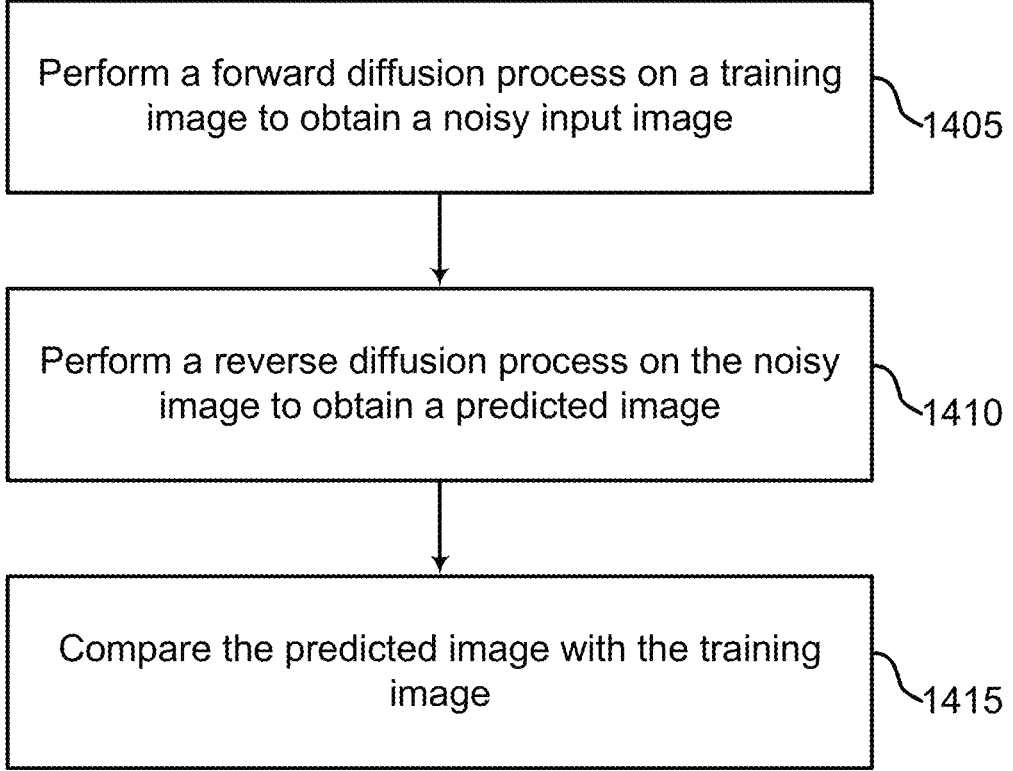
FIG. 14 shows an example of training a machine learning model according to aspects of the present disclosure.

In FIGS. 13-14, a method for training a machine learning model is described. One or more aspects of the method include obtaining training data including a first attribute token representing a first attribute, and a second attribute token representing a second attribute; identifying a first set of layers of an image generation model and a first set of time-steps for the first attribute token and a second set of layers of the image generation model and a second set of time-steps for the second attribute token; and training the image generation model to generate synthetic images comprising the first attribute and the second attribute by providing the first attribute token to the first set layers of the image generation model during the first set of time-steps and providing the second attribute token to the second set of layers of the image generation model during the second set of time-steps.

Some examples of the method, apparatus, and non-transitory computer readable medium further include performing a forward diffusion process on a training image to obtain a noisy input image. Some examples further include performing a reverse diffusion process on the noisy image to obtain a predicted image. Some examples further include comparing the predicted image with the training image.

Some examples of the method, apparatus, and non-transitory computer readable medium further include training the image generation model comprises training the image generation model to generate synthetic images comprising a color attribute, an object attribute, a style attribute, and a layout attribute.

Some examples of the method, apparatus, and non-transitory computer readable medium further include training the image generation model comprises computing a color-style disentanglement loss.

Some examples of the method, apparatus, and non-transitory computer readable medium further include obtaining the training data further comprises optimizing the first attribute token to represent the first attribute and optimizing the second attribute token to represent the second attribute.

Some examples of the method, apparatus, and non-transitory computer readable medium further include obtaining the training data further comprises obtaining a training image and a text prompt describing the training image, wherein the image generation is trained based on the training image and the text prompt.

FIG. 13 shows an example of a method 1300 for training a machine learning model including an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system obtains training data including a first attribute token representing a first attribute, and a second attribute token representing a second attribute. In some cases, the operations of this step refer to, or may be performed by, a machine learning model as described with reference to FIGS. 5-8.

For example, at operation 1305, the system acquires a dataset that includes diverse images, within which a first attribute token and a second attribute token are distinctly represented. The first attribute token corresponds to a particular attribute, such as color, observed across various images in the dataset. The second attribute token similarly represents another distinct attribute, such as style. These tokens may serve as proxies for their respective attributes, enabling the system to recognize and manipulate these attributes separately in the image generation process.

At operation 1310, the system identifies a first set of layers of an image generation model and a first set of time-steps for the first attribute token and a second set of layers of the image generation model and a second set of time-steps for the second attribute token. In some cases, the operations of this step refer to, or may be performed by, a machine learning model as described with reference to FIGS. 5-8.

For example, at operation 1310, the system identifies specific layers within the image generation model that are most effective on the attributes represented by the first and second tokens. The system identifies a first set of layers responsible for the type of information encoded by the first attribute token and a first set of time-steps is also identified. Similarly, the system determines a second set of layers tailored to the attributes of the second token, along with a second set of time-steps that ensure optimal engagement of these layers in attribute representation.

At operation 1315, the system trains the image generation model to generate synthetic images including the first attribute and the second attribute by providing the first attribute token to the first set layers of the image generation model during the first set of time-steps and providing the second attribute token to the second set of layers of the image generation model during the second set of time-steps. In some cases, the operations of this step refer to, or may be performed by, a training component as described with reference to FIGS. 5-8.

For example, at operation 1315, the system employs the designated sets of layers and time-steps to train the image generation model. This involves inputting the first attribute token into the first set of layers at the specified first set of time-steps to instill the model with the ability to render images that include the first attribute. Concurrently, the second attribute token is introduced into the second set of layers at the determined second set of time-steps. This dual-input approach allows the model to concurrently learn to depict both attributes accurately. Through repeated training iterations, the model becomes adept at generating synthetic images that authentically exhibit both the first and second attributes as defined by the respective tokens.

According to some embodiments, the image generation model is trained to generate synthetic images based on more than one attributes. The model is trained not only to replicate singular attribute but also to incorporate a spectrum of attributes. For example, these attributes include a color attribute that specifies the chromatic makeup of the image, an object attribute that specifies the central elements within the scene, a style attribute that specifies artistic and stylistic rendering, and a layout attribute that arranges the spatial distribution of elements within the image. Training the generation model involves training the model to generate complex images with an interplay of these attributes.

According to some embodiments, the image generation model is trained to minimize a color-style disentanglement loss. This particular loss function is calibrated to make the model able to discern and manipulate color and style attributes independently. The disentanglement loss quantifies the model's ability to alter one attribute, such as color, without inadvertently affecting the style of the generated image, thereby preserving the stylistic integrity while varying color schemes.

According to some embodiments, the acquisition of training data involves a refinement step for the attribute tokens. The first attribute token is optimized specifically to capture the essence of the first attribute with greater fidelity. Similarly, the second attribute token undergoes a fine-tuning process to enhance its representation of the second attribute. This optimization ensures that each token is a more precise embodiment of its respective attribute, facilitating clearer and more distinct attribute learning by the image generation model.

According to some embodiments, the process of obtaining training data includes the collection of training images alongside corresponding text prompts that describe them. The image generation model utilizes this paired data to learn correlations between textual descriptions and visual attributes. The training regime incorporates both the reference image and the descriptive prompts, allowing the model to understand and replicate the depicted attributes when generating new images based on textual input.

FIG. 14 shows an example for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system performs a forward diffusion process on a training image to obtain a noisy input image. In some cases, the operations of this step refer to, or may be performed by, a machine learning model as described with reference to FIGS. 5-8.

For example, at operation 1405, the system applies a forward diffusion process to a training image, increasing the level of noise within the image. This step may generate a series of progressively noisier images, resulting in a fully noised representation. These noised images provide a basis for the system to learn the intricate patterns of transitioning a noised image to a denoised image.

At operation 1410, the system performs a reverse diffusion process on the noisy image to obtain a predicted image. In some cases, the operations of this step refer to, or may be performed by, a machine learning model as described with reference to FIGS. 5-8.

For example, at operation 1410, the system performs a reverse diffusion process on the noisy image generated from operation 1405. The process iteratively denoises the image, leveraging the image generation model's trained parameters to restore the image to its original state or generate a new image that shares characteristics with the original. This step is used for training the model to produce clear and detailed synthetic images from a noisy starting point.

At operation 1415, the system compares the predicted image with the training image. In some cases, the operations of this step refer to, or may be performed by, a training component as described with reference to FIGS. 5-8.

For example, at operation 1415, the system compares the resulting image of the reverse diffusion process against the original training image. The system utilizes this comparison to calculate the difference between the predicted and original images, informing the optimization process for the image generation model.

Figure 15:
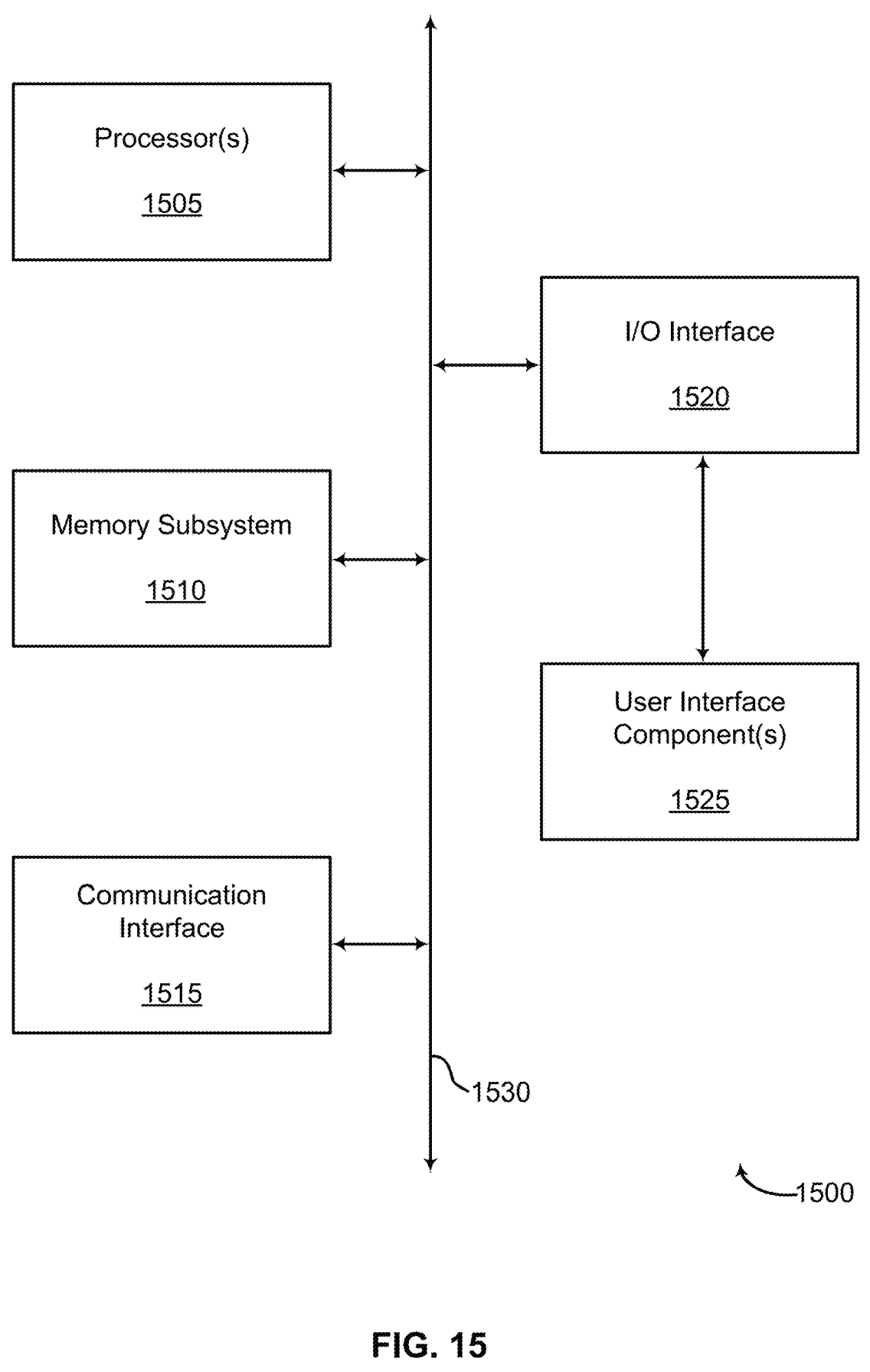

FIG. 15 shows an example of a computing device 1500 according to aspects of the present disclosure. computing device 1500 includes processor(s) 1505, memory subsystem 1510, communication interface 1515, I/O interface 1520, user interface component(s) 1525, and channel 1530.

In some embodiments, computing device 1500 is an example of, or includes aspects of, the image generation apparatus described with reference to FIGS. 1 and 5. In some embodiments, computing device 1500 includes one or more processors 1505 that can execute instructions stored in memory subsystem 1510 to generate synthetic images comprising a first attribute and a second attribute by providing a first attribute token to a first set layers of the image generation model during a first set of time-steps and providing a second attribute token to a second set of layers of the image generation model during a second set of time-steps According to some aspects, computing device 1500 includes one or more processors 1505. Processor(s) 1505 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1510 includes one or more memory devices. Memory subsystem 1510 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1520 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote control device interfaced with a user interface directly or through the I/O controller), or a combination thereof. In some cases, user interface component(s) 1525 include a GUI.

Evaluation

Embodiments of the present disclosure demonstrate multi-attribute transfer from a reference image. Specific embeddings for attributes such as $\alpha$, $\beta$, $\gamma$, and $\delta$ are learned using the proposed Equation (7). By specifying $\alpha$ and $\beta$ in the input, embodiments of the present disclosure generate images of cats in a watercolor style that adhere to the colors of the reference. Similarly, images of a bottle in a watercolor style are generated in $\gamma$ colors. Embodiments of the present disclosure correctly infer the layout and the object from the reference, producing images of pebbles stacked on top of each other. Embodiments of the present disclosure recognize the pencil sketch style ($\eta$) of a bird ($\theta$) from the reference, resulting in images that combine both attributes.

Embodiments of the present disclosure provide a user study concerning generated images. In an example, survey respondents were asked to select which set of images best represents the input constraints. The survey respondents were presented with a reference image, a text prompt, and a set of attributes from the reference image that should ideally be transferred to the final generated image. The results from this study indicate a preference for the images generated by the method proposed in the present disclosure, underscoring the effectiveness of the proposed inversion technique in constraining text-to-image generation.

Embodiments of the present disclosure thus provides an algorithm to learn attributes such as color, style, layout, and object from a reference image. This algorithm is then used for attribute-guided text-to-image synthesis. The present disclosure conditions both the layer and the time-step dimension. This approach results in a novel inversion algorithm that includes explicit disentanglement enhancing regularizers. Evaluations indicate that methods according to embodiments of the present disclosure effectively extracts attributes from the reference image and successfully transfers these attributes to new generations.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a text prompt, a first attribute token, and a second attribute token, wherein the first attribute token indicates a first target attribute having a first attribute category from a predetermined set of attribute categories including an object category, a style category, a color category, and a layout category, and wherein the second attribute token indicates a second target attribute having a second attribute category different than the first attribute category;
identifying a first set of layers of an image generation model and a first set of time-steps for the first attribute token based on the first attribute category and identifying a second set of layers of the image generation model and a second set of time-steps for the second attribute token based on the second attribute category; and
generating, using the image generation model, a synthetic image based on the text prompt, the first attribute token, and the second attribute token by providing the first attribute token to the first set of layers of the image generation model during the first set of time-steps and providing the second attribute token to the second set of layers of the image generation model during the second set of time-steps, wherein the first attribute token is provided to the image generation model to a different set of layers and during a different set of time-steps than the second attribute token, and wherein the synthetic image has the first target attribute and the second target attribute.

2. The method of claim 1, wherein:
the first attribute token comprises a first token type and the second attribute token comprises a second token type, and wherein the first token type and the second token type are selected from a set of token types including a color token type, an object token type, a style token type, and a layout token type.

3. The method of claim 1, wherein:
the synthetic image includes an element described by the text prompt, a first attribute represented by the first attribute token, and a second attribute represented by the second attribute token.

4. The method of claim 3, wherein:
the first attribute token and the second attribute token comprise learnable tokens corresponding to the first attribute and the second attribute, respectively.

5. The method of claim 3, wherein obtaining the first attribute token and the second attribute token comprises:
receiving a user input indicating the first attribute and the second attribute.

6. The method of claim 1, wherein:
the first set of layers does not overlap with the second set of layers, and the first set of time-steps does not overlap with the second set of time-steps.

7. The method of claim 1, wherein generating the synthetic image comprises:

performing a reverse diffusion process on a noisy input image, wherein the reverse diffusion process is based on a plurality of time-steps including the first set of time-steps and the second set of time-steps.

8. The method of claim 1, further comprising:

encoding the text prompt to obtain a text embedding, where the synthetic image is generated based on the text embedding.

9. A method for training a machine learning model, comprising:

obtaining training data including a first attribute token representing a first attribute, and a second attribute token representing a second attribute, wherein the first attribute token indicates a first target attribute having a first attribute category from a predetermined set of attribute categories including an object category, a style category, a color category, and a layout category, and wherein the second attribute token indicates a second target attribute having a second attribute category different than the first attribute category;

identifying a first set of layers of an image generation model and a first set of time-steps for the first attribute token based on the first attribute category and identifying a second set of layers of the image generation model and a second set of time-steps for the second attribute token based on the second attribute category; and training the image generation model to generate synthetic images comprising the first attribute and the second attribute by providing the first attribute token to the first set of layers of the image generation model during the first set of time-steps and providing the second attribute token to the second set of layers of the image generation model during the second set of time-steps, wherein the first attribute token is provided to the image generation model to a different set of layers and during a different set of time-steps than the second attribute token, and wherein the synthetic images have the first target attribute and the second target attribute.

10. The method of claim 9, wherein training the image generation model comprises:

performing a forward diffusion process on a training image to obtain a noisy input image;

performing a reverse diffusion process on the noisy image to obtain a predicted image; and comparing the predicted image with the training image.

11. The method of claim 9, wherein training the image generation model comprises:

training the image generation model to generate synthetic images comprising a color attribute, an object attribute, a style attribute, and a layout attribute.

12. The method of claim 9, wherein training the image generation model comprises:

training the image generation model comprises computing a color-style disentanglement loss.

13. The method of claim 9, wherein obtaining the training data further comprises:

optimizing the first attribute token to represent the first attribute and optimizing the second attribute token to represent the second attribute.

14. The method of claim 9, wherein obtaining the training data further comprises:

obtaining a training image and a text prompt describing the training image, wherein the image generation model is trained based on the training image and the text prompt.

15. An apparatus for image processing, comprising:

at least one processor;

at least one memory storing instruction executable by the at least one processor; and the apparatus further comprising an image generation model comprising parameters stored in the at least one memory and trained to generate synthetic images comprising a first attribute and a second attribute by providing a first attribute token to a first set of layers of the image generation model during a first set of time-steps and providing a second attribute token to a second set of layers of the image generation model during a second set of time-steps, wherein the first attribute token is provided to the image generation model to a different set of layers and during a different set of time-steps than the second attribute token, and wherein the synthetic images have the first attribute and the second attribute.

16. The apparatus of claim 15, wherein:

the image generation model comprises a U-Net architecture, and wherein the first set of layers and the second set of layers comprise different layers of the U-Net architecture.

17. The apparatus of claim 15, wherein:

the first attribute comprises a color attribute or a style attribute and the first set of layers comprises moderate resolution layers of the image generation model.

18. The apparatus of claim 15, wherein:

the second attribute comprises an object attribute or a layout attribute and the second set of layers comprises coarse resolution layers of the image generation model.

19. The apparatus of claim 15, wherein:

the first attribute comprises a color attribute, a style attribute, or a layout attribute, and the first set of time-steps comprises an initial set of time-steps.

20. The apparatus of claim 15, wherein:

the second attribute comprises an object attribute and the second set of time-steps comprises a middle set of time-steps.

\* \* \* \* \*